United States Patent
Escudero et al.

(10) Patent No.: US 11,855,907 B2
(45) Date of Patent: Dec. 26, 2023

(54) ROBOT CONTROL SYSTEM AND CONTROL METHOD

(71) Applicant: OMRON CORPORATION, Kyoto (JP)

(72) Inventors: Diego Escudero, Barcelona (ES); Ferran Carlas, Barcelona (ES); Raffaele Vito, Barcelona (ES); Yoshihide Tamura, Kyoto (JP); Taku Oya, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 0 days.

(21) Appl. No.: 17/908,141

(22) PCT Filed: Dec. 17, 2020

(86) PCT No.: PCT/JP2020/047238
§ 371 (c)(1),
(2) Date: Aug. 30, 2022

(87) PCT Pub. No.: WO2021/181799
PCT Pub. Date: Sep. 16, 2021

(65) Prior Publication Data
US 2023/0132698 A1 May 4, 2023

(30) Foreign Application Priority Data
Mar. 13, 2020 (JP) .................................. 2020-044123

(51) Int. Cl.
*H04L 47/762* (2022.01)
*H04L 47/43* (2022.01)
(Continued)

(52) U.S. Cl.
CPC ............ *H04L 47/762* (2013.01); *H04L 47/43* (2022.05); *H04L 47/826* (2013.01); *H04L 67/125* (2013.01); *G05D 1/0088* (2013.01)

(58) Field of Classification Search
CPC ............................. H04Q 9/00; G05D 1/0088
See application file for complete search history.

(56) References Cited

U.S. PATENT DOCUMENTS

| 2012/0250528 A1 | 10/2012 | Yamada et al. |
| 2019/0084161 A1 | 3/2019 | Tokuhashi et al. |

(Continued)

FOREIGN PATENT DOCUMENTS

| JP | 2012-220961 A | 11/2012 |
| JP | 2018-196908 A | 12/2018 |

(Continued)

OTHER PUBLICATIONS

International Search Report for PCT/JP2020/047238 dated Mar. 16, 2021 [PCT/ISA/210].

(Continued)

*Primary Examiner* — Barbara B Anyan
(74) *Attorney, Agent, or Firm* — Sughrue Mion, PLLC

(57) ABSTRACT

A robot control system includes a first control device including a first communication unit and one or more second control devices connected to the first control device through a network. Each of the second control devices includes a second communication unit that exchanges data with the first communication unit of the first control device using a communication resource of a network allocated thereto, and a command value generation unit that sequentially generates a command value for driving the robot, in accordance with a command from the first control device. The robot control (Continued)

system includes a communication resource setting unit that allocates the communication resource to each second control device.

19 Claims, 20 Drawing Sheets

(51) Int. Cl.
*H04L 47/70* (2022.01)
*H04L 67/125* (2022.01)
*G05D 1/00* (2006.01)

(56) References Cited

U.S. PATENT DOCUMENTS

| | | | |
|---|---|---|---|
| 2019/0253355 A1 | 8/2019 | Sawada et al. | |
| 2020/0125116 A1* | 4/2020 | Wang | B25J 11/0085 |
| 2020/0171671 A1* | 6/2020 | Huang | G05D 1/0088 |
| 2021/0072758 A1* | 3/2021 | Kim | B60N 2/002 |
| 2022/0281106 A1* | 9/2022 | Higashi | H04Q 9/00 |

FOREIGN PATENT DOCUMENTS

| | | |
|---|---|---|
| JP | 2019-054409 A | 4/2019 |
| JP | 2019-140603 A | 8/2019 |
| JP | 2021-037566 A | 3/2021 |
| JP | 2021-128662 A | 9/2021 |

OTHER PUBLICATIONS

Written Opinion for PCT/JP2020/047238 dated Mar. 16, 2021 [PCT/ISA/237].

Office Action dated Jun. 6, 2023 in Japanese Application No. 2020-044123.

\* cited by examiner

ROBOT CONTROL SYSTEM AND CONTROL METHOD

CROSS REFERENCE TO RELATED APPLICATIONS

This application is a National Stage of International Application No. PCT/JP2020/047238 filed Dec. 17, 2020, claiming priority based on Japanese Patent Application No. 2020-044123 filed Mar. 13, 2020, the contents of each of which being herein incorporated by reference in their entireties.

TECHNICAL FIELD

The present technique relates to a robot control system and a control method.

BACKGROUND ART

Conventionally, a robot has been used for various applications in a factory automation (FA) field. In such the robot, a robot controller executes a predetermined program to sequentially generate a command and the like required for control.

For example, Japanese Patent Laying-Open No. 2018-196908 (PTL 1) discloses a configuration in which an automated facility using the robot is constructed at low cost without learning a robot language.

CITATION LIST

Patent Literature

PTL 1: Japanese Patent Laying-Open No. 2018-196908

SUMMARY OF INVENTION

Technical Problem

In an actual production facility, a plurality of robots are often disposed. The configuration described in CITATION LIST does not assume the case where the plurality of robots are disposed.

An object of the present technique is to provide a robot control system suitable for the production facility including one or more robots.

Solution to Problem

A robot control system according to an embodiment of the present technique includes a first control device including a first communication unit and one or more second control devices network-connected to the first control device. Each of the second control devices includes a second communication unit that exchanges data with the first communication unit of the first control device using a communication resource of a network allocated thereto, and a command value generation unit that sequentially generates a command value for driving the robot, in accordance with a command from the first control device. The robot control system includes a communication resource setting unit that allocates the communication resource to each second control device.

According to this configuration, the communication resource setting unit appropriately allocates the communication resource to each second control device, whereby control performance can be maintained even when the plurality of second control devices are network-connected.

The communication resource setting unit may determine the communication resource allocated to each second control device in accordance with a predetermined allocation setting. According to this configuration, the appropriate communication resource can be reliably set using the previously-determined allocation setting depending on the connected second control device.

The communication resource setting unit may determine the communication resource allocated to each second control device depending on a number of the second control devices connected to the first control device through the network. According to this configuration, the communication resource can be appropriately allocated to each second control device in consideration of the limitation of the transmission capacity of the network.

The communication resource setting unit may determine the communication resource allocated to each second control device depending on an operation state of at least one of one or more second control devices. According to this configuration, the communication resource can be dynamically allocated to the second control device that requires more communication resources in the second control devices.

The communication resource setting unit may be implemented in the first communication unit of the first control device. According to this configuration, the communication resource can be collectively allocated by the first communication unit of the first control device.

The second communication unit of the second control device may transmit a state value related to drive of the robot to the first control device. According to this configuration, the control device can collect the state value related to the drive of the robot from each second control device.

The robot control system may further include an external device configured to determine a setting related to allocation of the communication resource by the communication resource setting unit in accordance with a user operation. According to this configuration, the allocation of the communication resource to the user can be supported.

The communication resource setting unit may adjust a size of the communication resource by changing a length of a communication frame transmitted on the network. Furthermore, the communication resource setting unit may adjust a size of the communication resource by changing a communication period of a communication frame transmitted on the network.

According to these configurations, the communication resource can be appropriately allocated to each second control device in consideration of the limitation of the transmission capacity of the network.

Another embodiment of the present technique is directed to a control method in a robot control system including a first control device with a first communication unit and one or more second control devices connected to the first control device through a network. The control method includes allocating a communication resource of the network to each second control device, exchanging, by each second control device, data with the first control device using the communication resource allocated to each second control device, and generating sequentially, by each second control device, a command value for driving a robot in accordance with a command from the first control device.

Advantageous Effects of Invention

According to the present technology, the robot control system suitable for the production facility including one or more robots can be implemented.

DESCRIPTION OF EMBODIMENT

Figure 1:
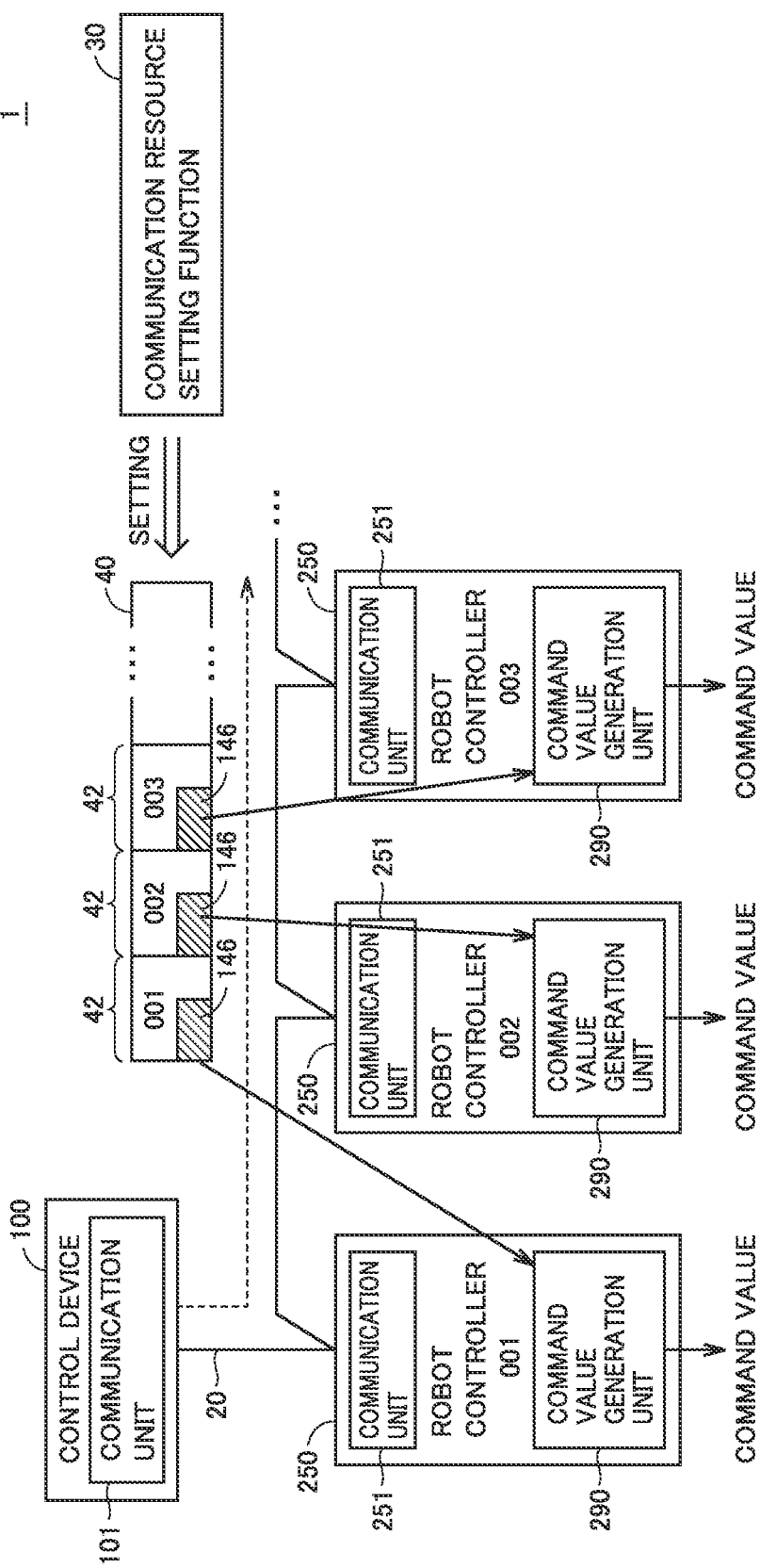
FIG. 1 is a schematic diagram illustrating an outline of a robot control system according to an embodiment.

With reference to the drawings, an embodiment of the technique will be described in detail. The same or equivalent portion in the drawings is denoted by the same reference numeral, and the description will not be repeated.

A. Application Example

An example of a scene to which the technique is applied will be described. FIG. 1 is a schematic diagram illustrating an outline of a robot control system 1 according to an embodiment.

Referring to FIG. 1, robot control system 1 includes a control device 100 (first control device) and one or more robot controllers 250 (second control device) that is network-connected to control device 100 through a field network 20. Each of robot controllers 250 outputs a command value controlling a robot.

In the following description, a configuration example of robot control system 1 that mainly controls the robot will be described. However, a control target of robot control system 1 is not limited to the robot. For example, in addition to the robot, control device 100 can control various devices and machines constituting a production facility including the robot. Furthermore, control device 100 may be linked with a safety controller that monitors the operation of the robot. That is, in the present specification, the term "robot control system" is used in meaning of a system having a function of controlling the robot, but does not exclude the control other than the robot.

Control device 100 generates a command 146 instructing the behavior of the robot for each robot controller 250 by executing a robot program described later.

As a configuration exchanging data, control device 100 includes a communication unit 101 (constituted of a field network controller 108, a communication control module 160, a communication driver 162, and the like, which will be described later), and each of robot controllers 250 includes a communication unit 251 (constituted of a field network controller 252, a communication control module 280, a communication driver 282, and the like, which will be described later).

Typically, control device 100 and one or more robot controllers 250 exchange data through a communication frame 40. In communication frame 40, a communication resource 42 is allocated for each robot controller 250. Communication unit 251 of robot controller 250 exchanges the data with communication unit 101 of control device 100 using communication resources 42 allocated to communication unit 251.

In the present specification, the "communication resource" means a capacity capable of transmitting and receiving the data through a network (transmission path). The "communication resource" is determined by a frequency of a carrier existing on the network, a length and a period of a communication frame forwarded on the network, a time width of time division, and the like. In the following description, as a typical example, on the assumption that communication frame 40 having a predetermined data size circulates in field network 20, the data size of communication frame 40 is divided and associated with each allocation destination, thereby implementing the allocation of the communication resources. However, the communication resource may be allocated by controlling not only the method for dividing the data size of communication frame 40 but also the communication time or the communication frequency set to each allocation destination or the frequency width allocated to each allocation destination. Furthermore, the allocation of the communication resource may be implemented using any known method.

Typically, each of robot controllers 250 executes various types of processing by referring to information such as command 146 stored in communication resource 42 allocated to itself included in communication frame 40. The processing executed by robot controller 250 includes processing for sequentially generating a command value for driving the robot in accordance with command 146 from control device 100. More specifically, a command value generation module 290 of robot controller 250 sequentially generates the command value. The command value is control information driving each axis of the robot.

Because the axis of the robot may constitute a joint (joint), the axis is also referred to as "axis or joint" of the robot in the following description. That is, in the present specification, the term "axis" of the robot is used in meaning including the axis and the joint.

As illustrated in FIG. 1, robot control system 1 has a communication resource setting function 30 for setting communication resource 42 of field network 20 used to exchange the data between control device 100 and one or more robot controllers 250. Typically, communication resource setting function 30 allocates communication resource 42 to each of robot controllers 250.

Even when the plurality of robot controllers 250 are connected to field network 20, data communication through field network 20 can be maintained by optimizing the allocation of communication resources 42 by communication resource setting function 30.

Thus, one control device 100 can control the plurality of robot controllers 250, and the cost of entire robot control system 1 can be reduced.

Control device 100 only needs to generate command 146, and each robot controller 250 operates the command value output to the robot, so that an increase in the processing load of control device 100 can be prevented even when the number of robots increases.

B. System Configuration Example

A configuration example of robot control system 1 of the embodiment will be described below.

Figure 2:
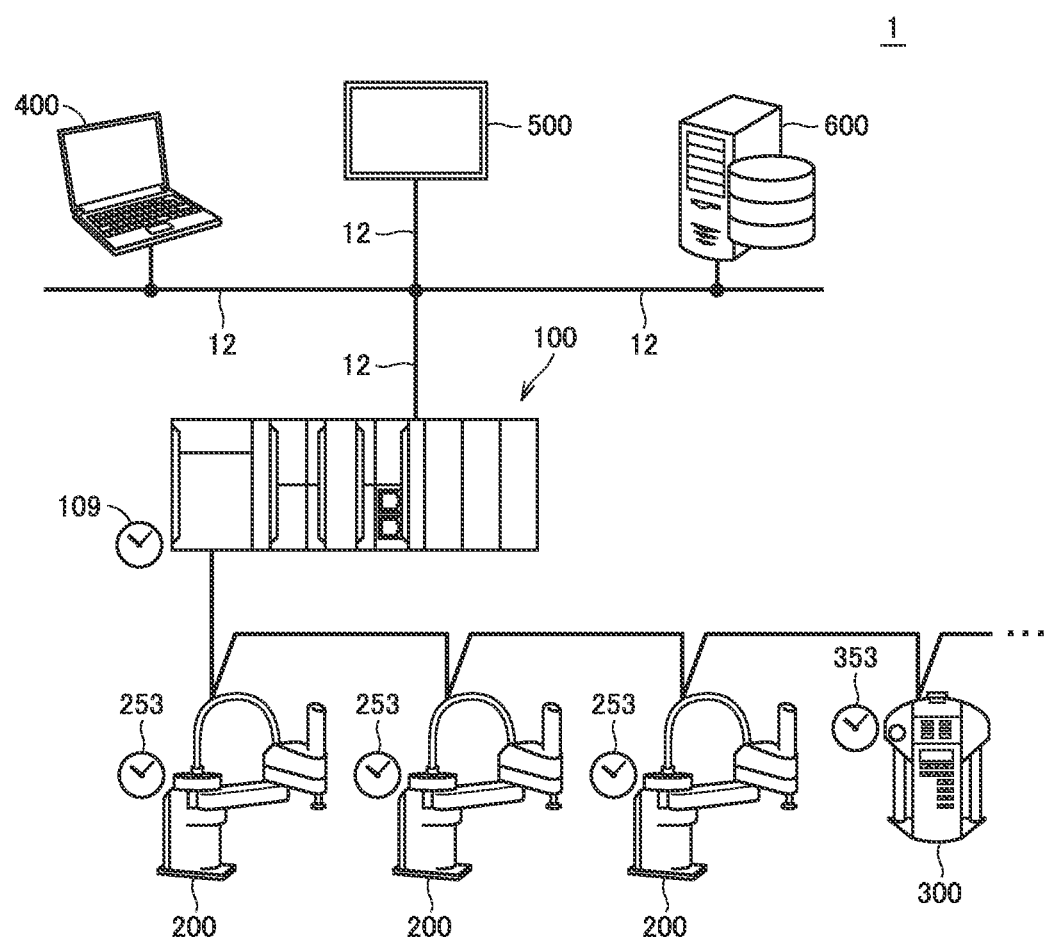
FIG. 2 is a schematic diagram illustrating a configuration example of the robot control system of the embodiment.

FIG. 2 is a schematic diagram illustrating a configuration example of robot control system 1 of the embodiment. Referring to FIG. 2, robot control system 1 of the embodiment includes control device 100 and one or more robots 200 connected to control device 100 through field network 20.

The behavior of each of robots 200 is controlled by robot controller 250. Robot controller 250 is network-connected to control device 100, and controls robot 200. More specifically, robot controller 250 outputs the command value controlling robot 200 in accordance with an instruction (command 146) from control device 100. A custom robot 200A having one or more axes or joints arbitrarily produced according to an application may be used as robot 200. Furthermore, any general-purpose robot 200B such as a horizontal articulated (scalar) robot, a vertical articulated robot, a parallel link robot, or an orthogonal robot may be used as robot 200.

Any device such as an I/O unit, a safety I/O unit, and a safety controller may be connected to field network 20. In the configuration example of FIG. 2, an operation pendant 300 operating robot 200 is connected to field network 20.

EtherCAT (registered trademark), EtherNet/IP, or the like, which is an industrial network protocol, can be used for field network 20. The device (control device 100, robot controller 250, operation pendant 300, and the like) connected to field network 20 includes counter 109, 253, 353 implementing synchronous data communication. Details of counter 109, 253, 353 will be described later.

Control device 100 may be connected to a support device 400, a display device 500, and a server device 600 through a higher-order network 12. EtherNet/IP or the like that is the industrial network protocol can be used for higher-order network 12.

C. Hardware Configuration Example

A hardware configuration example of main devices constituting control system 1 in FIG. 2 will be described below.

c1: Control Device 100

Figure 3:
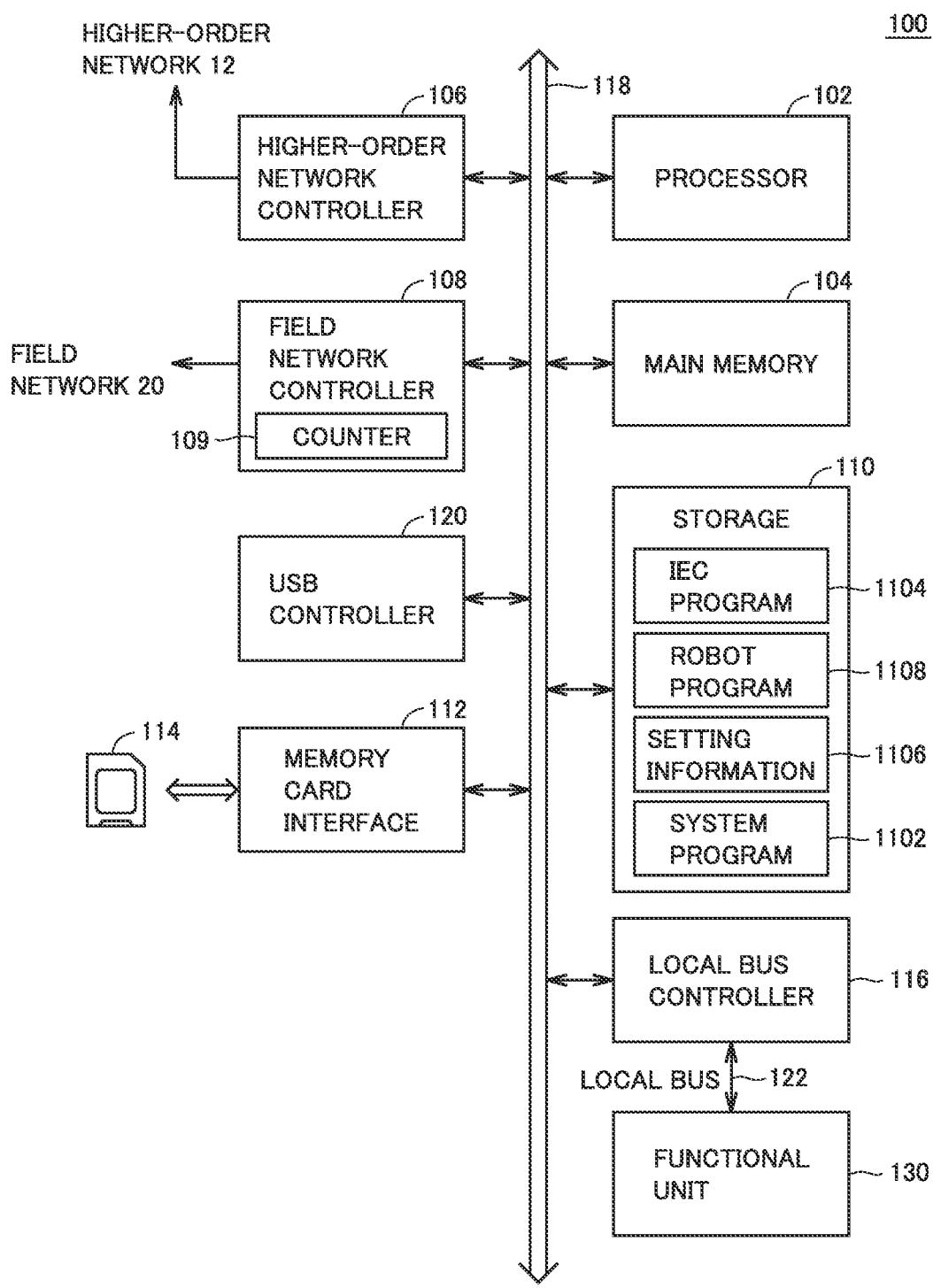
FIG. 3 is a schematic diagram illustrating a hardware configuration example of a control device constituting the robot control system of the embodiment.

FIG. 3 is a schematic diagram illustrating the hardware configuration example of control device 100 constituting robot control system 1 of the embodiment. As illustrated in FIG. 3, control device 100 includes a processor 102, a main memory 104, a storage 110, a memory card interface 112, a higher-order network controller 106, a field network controller 108, a local bus controller 116, and a universal serial bus (USB) controller 120 that provides a USB interface. These components are connected to each other through a processor bus 118.

Processor 102 corresponds to an arithmetic processing unit that executes control arithmetic operation, and is constituted of a central processing unit (CPU), a graphics processing unit (GPU), and the like. Specifically, processor 102 reads various programs stored in storage 110, expands the various programs in main memory 104, and executes the various programs, thereby implementing the control arithmetic operation for the control target.

Main memory 104 includes a dynamic random access memory (DRAM), a static random access memory (SRAM), or the like. Storage 110 is constructed with a nonvolatile storage device such as a solid state drive (SSD) and a hard disk drive (HDD).

A system program 1102 implementing a basic function and an International Electrotechnical Commission (IEC) program 1104 produced according to the control target are stored in storage 110. IEC program 1104 can include a sequence command and/or a motion command.

In the present specification, the "IEC program" is used to mean a program that defines processing executed by a general programmable logic controller (PLC). Typically, the IEC program means a program described in any language defined by IEC 61131-3 defined by the IEC. However, the IEC program may include a program described in a manufacturer own language other than the language defined by IEC 61131-3.

Storage 110 may further store a robot program 1108 and setting information 1106 in order to control the behavior of robot 200. Robot program 1108 may be described in a predetermined programming language (for example, a programming language for robot control such as V+ language or a programming language related to NC control such as G code) as described later.

Setting information 1106 includes various settings related to field network 20 and various setting values (for example, a speed limit value, an acceleration limit value, and a jerk limit value) for robot 200.

Memory card interface 112 receives memory card 114 that is an example of a detachable recording medium. Memory card interface 112 can read and write arbitrary data from and in memory card 114.

Higher-order network controller 106 exchanges the data with an arbitrary information processing device (support device 400, display device 500, server device 600, and the like in FIG. 2) through a high-order network.

Field network controller 108 exchanges data with an arbitrary device such as robot 200 through field network 20. In the system configuration example of FIG. 2, field network controller 108 may function as a communication master of field network 20. Field network controller 108 includes a counter 109 that is maintained in a synchronous state between devices connected to field network 20. Field network controller 108 manages a sending timing and the like of a communication frame 40 described later based on counter 109.

Local bus controller 116 exchanges data with an arbitrary functional unit 130 constituting control device 100 through a local bus 122. For example, functional unit 130 includes an analog I/O unit that is responsible for inputting and/or outputting an analog signal, a digital I/O unit that is responsible for inputting and/or outputting a digital signal, and a counter unit that receives a pulse from an encoder.

USB controller 120 exchanges the data with an arbitrary information processing device through the USB connection.

The function related to the control of robot 200 provided by control device 100 will be described later.

c2: Robot 200 and Robot Controller 250

Figure 4:
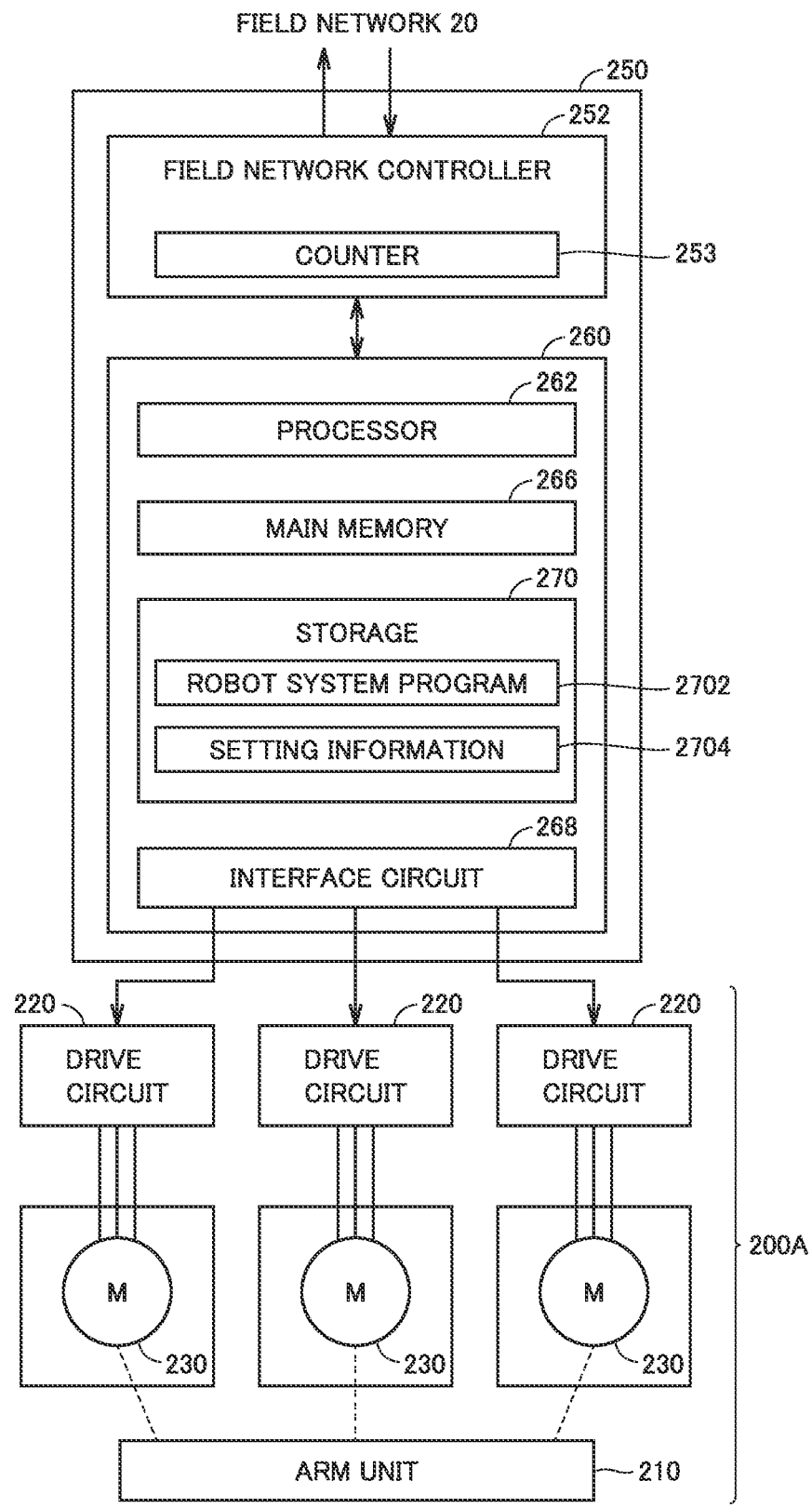
FIG. 4 is a schematic diagram illustrating a hardware configuration example of a robot constituting the robot control system of the embodiment.

FIG. 4 is a schematic diagram illustrating the hardware configuration example of robot 200 constituting robot control system 1 of the embodiment. FIG. 4 illustrates a configuration example in the case where custom robot 200A is adopted as robot 200.

Referring to FIG. 4, custom robot 200A is connected to robot controller 250. Custom robot 200A and robot controller 250 may be constituted integrally or separately.

Custom robot 200A includes a drive circuit 220 corresponding to the number of shafts or joints and a motor 230 driven by drive circuit 220. Each of drive circuits 220 includes a converter circuit, an inverter circuit, and the like, generates power of a voltage, a current, and a phase designated in accordance with the command value from robot controller 250, and supplies the power to motor 230.

Each of motors 230 is an actuator that is mechanically coupled to any shaft or joint of an arm unit 210 constituting custom robot 200A and drives the corresponding shaft or joint by rotation of motor 230.

A motor having a characteristic corresponding to arm unit 210 to be driven can be adopted as motor 230. For example, as motor 230, any of an induction type motor, a synchronous type motor, a permanent magnet type motor, and a reluctance motor may be adopted, and not only a rotation type but also a linear motor may be adopted. Drive circuit 220 corresponding to motor 230 of a drive target is adopted.

Robot controller 250 includes field network controller 252 and a control processing circuit 260.

Field network controller 252 exchanges the data with a communication unit such as field network controller 108 of control device 100 using the communication resource of field network 20 allocated to each field network controller. Field network controller 252 includes a counter 253 that is maintained in the synchronous state between devices connected to field network 20. Field network controller 252 may act as a communication slave of field network 20 operating in accordance with control device 100 acting as a communication master.

Control processing circuit 260 executes arithmetic processing required for driving custom robot 200A. As an example, control processing circuit 260 includes a processor 262, a main memory 266, a storage 270, and an interface circuit 268.

Processor 262 executes a control arithmetic operation driving custom robot 200A. Main memory 266 is constituted of a volatile storage device such as a DRAM or an SRAM. For example, storage 270 includes a non-volatile storage device such as an HDD or an SSD.

Storage 270 stores a robot system program 2702 implementing the control for driving robot 200, and setting information 2704 including a setting parameter group required for the processing in robot controller 250.

Interface circuit 268 gives the command value to each drive circuit 220. Interface circuit 268 and drive circuit 220 may be electrically connected by a hard wire, or connected by a data link.

Figure 5:
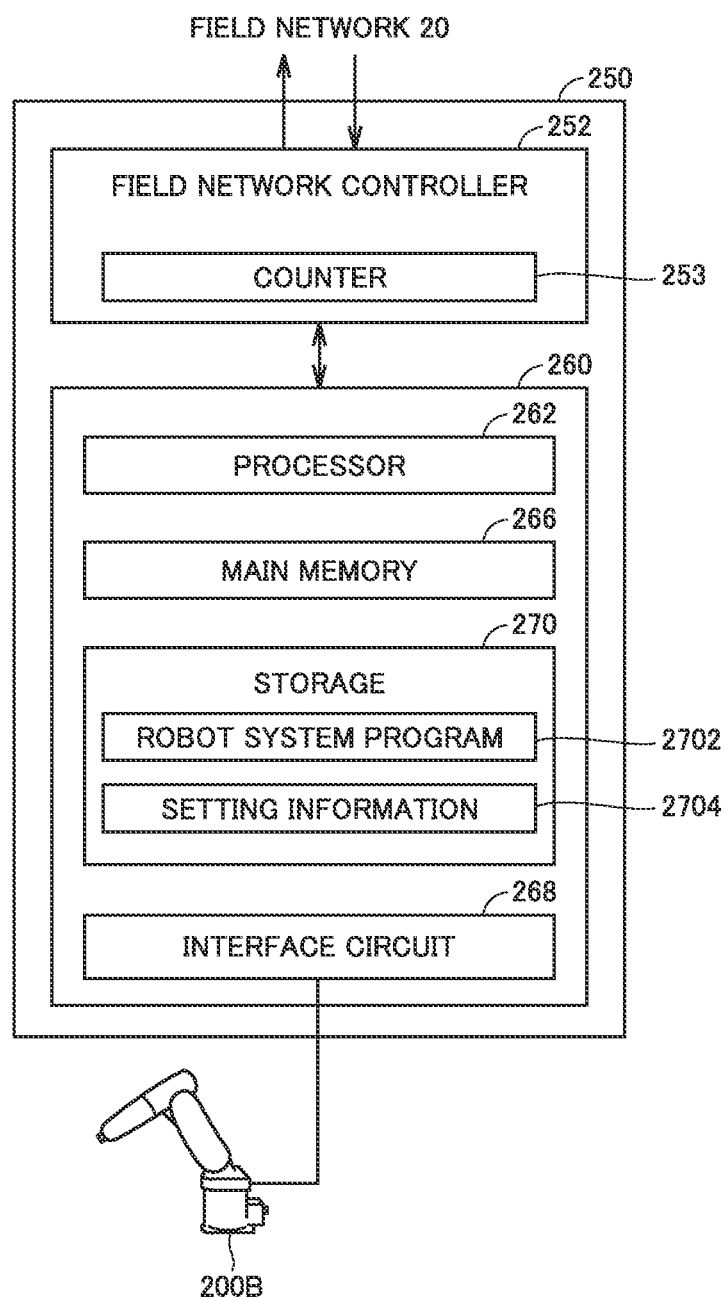
FIG. 5 is a schematic diagram illustrating another hardware configuration example of the robot constituting the robot control system of the embodiment.

FIG. 5 is a schematic diagram illustrating another hardware configuration example of robot 200 constituting robot control system 1 of the embodiment. FIG. 5 illustrates the configuration example in the case where a general-purpose robot 200B is adopted as robot 200.

Referring to FIG. 5, one or more motors and drive circuits (not illustrated) are incorporated in general-purpose robot 200B, and when a target trajectory of general-purpose robot 200B is indicated, one or more motors are driven in accordance with the indicated target trajectory.

When custom robot 200A in FIG. 4 is driven, each command value to drive circuit 220 corresponding to the shaft or the joint is required to be given, whereas when general-purpose robot 200B in FIG. 5 is driven, only the target trajectory of general-purpose robot 200B is required to be instructed.

The function related to the control of robot 200 provided by robot controller 250 will be described later.

c3: Operation Pendant 300

Figure 6:
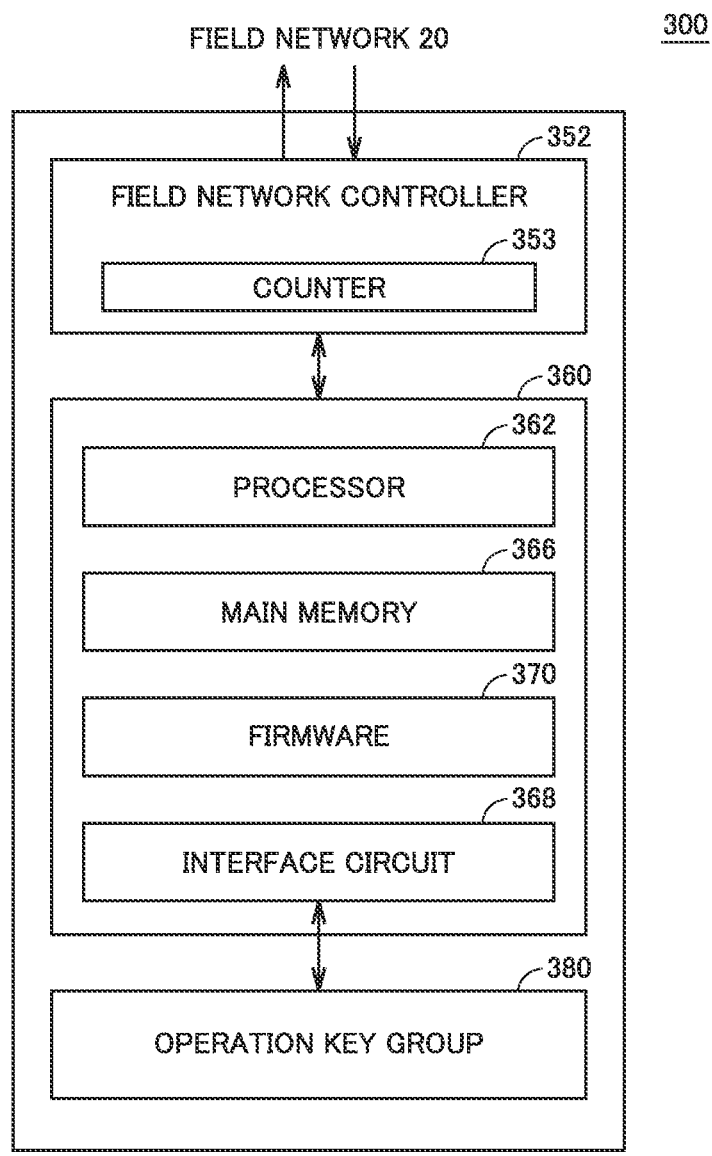
FIG. 6 is a schematic diagram illustrating a hardware configuration example of an operation pendant constituting the robot control system of the embodiment.

FIG. 6 is a schematic diagram illustrating a hardware configuration example of operation pendant 300 constituting robot control system 1 of the embodiment. Referring to FIG. 6, operation pendant 300 includes a field network controller 352, a control processing circuit 360, and an operation key group 380.

Field network controller 352 mainly exchanges the data with control device 100 through field network 20. Field network controller 352 includes a counter 353 that is maintained in the synchronous state between devices connected to field network 20. Field network controller 352 may act as the communication slave of field network 20 operating in accordance with control device 100 acting as the communication master.

Control processing circuit 360 includes a processor 362, a main memory 366, firmware 370, and an interface circuit 368.

Processor 362 executes firmware 370 to implement the processing required for operation pendant 300. Main memory 366 is constituted of a volatile storage device such as a DRAM or an SRAM.

Interface circuit 368 exchanges a signal with operation key group 380.

Operation key group 380 is an input device that receives a user operation. Operation key group 380 may include an indicator indicating an input state and the like.

c4: Support Device 400

Figure 7:
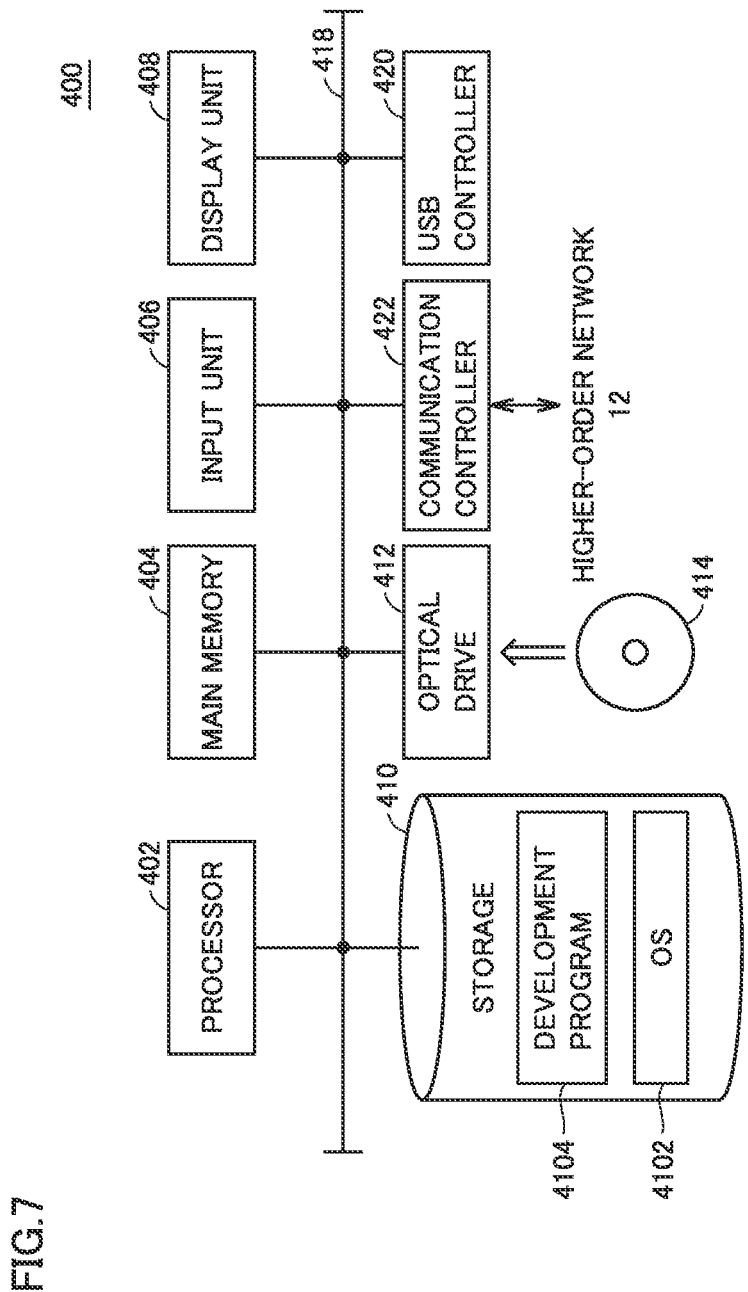
FIG. 7 is a schematic diagram illustrating a hardware configuration example of a support device constituting the robot control system of the embodiment.

FIG. 7 is a schematic diagram illustrating a hardware configuration example of support device 400 constituting robot control system 1 of the embodiment. For example, support device 400 may be implemented using a general-purpose personal computer.

As illustrated in FIG. 7, support device 400 includes a processor 402, a main memory 404, an input unit 406, an output unit 408, a storage 410, an optical drive 412, a USB controller 420, and a communication controller 422. These components are connected to each other through a processor bus 418.

Processor 402 is constructed of a CPU, a GPU, and the like, and reads a program (as an example, an OS 4102 and a development program 4104) stored in storage 410, develops the program in main memory 404, and executes the program, thereby implementing various pieces of processing required for support device 400.

Main memory 404 is configure of a volatile storage device such as a DRAM or an SRAM. For example, storage 410 includes a non-volatile storage device such as an HDD or an SSD.

Storage 410 stores OS 4102 implementing the basic function, development program 4104 implementing a development environment, and the like. A program executed by control device 100, debugging of the program, setting of the operation of control device 100, setting of the operation of the device connected to control device 100, setting of field network 20, and the like can be performed in the development environment.

Input unit 406 includes a keyboard, a mouse, and the like, and receives a user operation. Display unit 408 includes a display, various indicators, and the like, and displays processing results and the like by processor 402.

USB controller 420 exchanges the data with control device 100 and the like through the USB connection. Communication controller 422 exchanges the data with an arbitrary information processing device through higher-order network 12.

Support device 400 includes optical drive 412, and a program stored in a storage medium 414 (for example, an optical storage medium such as a digital versatile disc (DVD)) in which a computer-readable program is non-transiently stored is read and installed in storage 410 or the like.

Development program 4104 and the like executed by support device 400 may be installed through computer-readable storage medium 414, or installed by being downloaded from the server device or the like on the network. Sometimes functions provided by support device 400 of the first embodiment are implemented using a part of modules provided by OS 4102.

Support device 400 may be removed from control device 100 during the operation of robot control system 1.

c5: Display Device 500

Display device 500 constituting robot control system 1 of the embodiment may be implemented using a general-purpose personal computer as an example. A basic hardware configuration example of display device 500 is similar to the hardware configuration example of support device 400 in FIG. 7, so that detailed description is not made herein.

c6: Server Device 600

Server device 600 constituting robot control system 1 of the embodiment may be implemented using a general-purpose personal computer as an example. A basic hardware configuration example of server device 600 is similar to the hardware configuration example of support device 400 in FIG. 7, so that detailed description is not made herein.

c7: Other Forms

Although the configuration example in which necessary functions are provided by one or more processors executing the program has been described in FIGS. 3 to 7, some or all of these provided functions may be implemented using a dedicated hardware circuit (for example, an application specific integrated circuit (ASIC) and a field-programmable gate array (FPGA)).

A main part of control device 100 may be implemented using hardware (for example, an industrial personal computer based on a general-purpose personal computer) according to a general-purpose architecture. In this case, the plurality of OSs having different uses may be executed in parallel using a virtualization technology, and the required application may be executed on each OS. Furthermore, a configuration in which functions such as support device 400 and display device 500 are integrated with control device 100 may be adopted.

D. Functional Configuration Example

An example of a functional configuration controlling robot 200 will be described.

Figure 8:
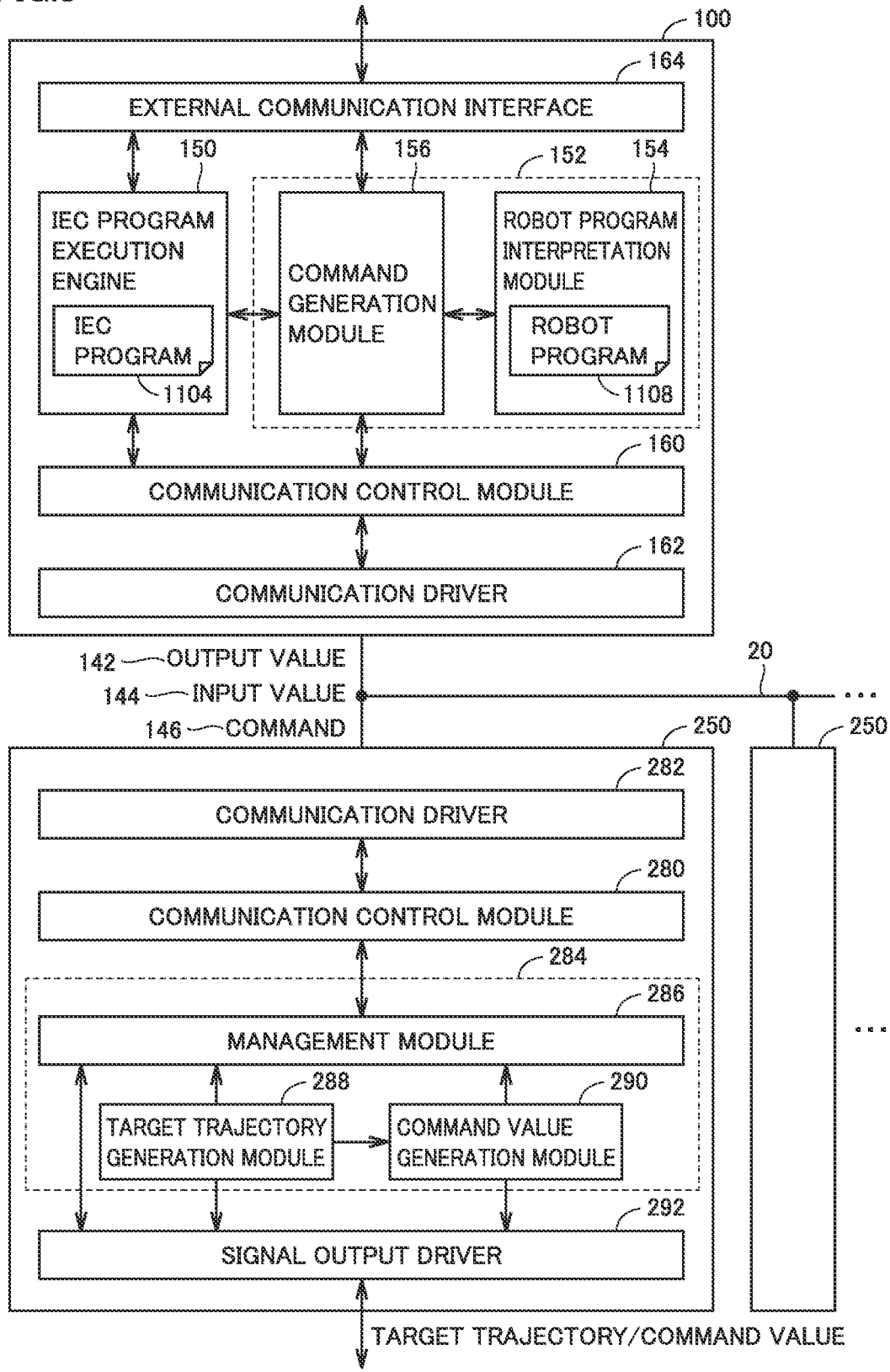
FIG. 8 is a schematic diagram illustrating an example of a functional configuration controlling behavior of the robot in the robot control system of the embodiment.

FIG. 8 is a schematic diagram illustrating an example of the functional configuration controlling the behavior of robot 200 in robot control system 1 of the embodiment. Referring to FIG. 8, command 146 controlling robot 200 and the like are exchanged between control device 100 and one or more robot controllers 250.

Control device 100 includes an IEC program execution engine 150, a robot program execution engine 152, a communication control module 160, a communication driver 162, and an external communication interface 164. Typically, these element may be implemented by processor 102 of control device 100 executing system program 1102.

IEC program execution engine 150 (second program execution unit) periodically generates an output value 142 given to robot controller 250 by executing IEC program 1104. More specifically, IEC program execution engine 150 cyclically executes IEC program 1104 every predetermined control period. The control period of control device 100 is typically assumed to be about several hundred μsec to several 100 msec. IEC program execution engine 150 outputs an internal command (for example, transmission start and transmission stop of command 146) to robot program execution engine 152 and/or acquires a state value (for example, the state of robot program 1108 executed by robot program execution engine 152) from robot program execution engine 152 in accordance with the execution of IEC program 1104.

Robot program execution engine 152 (first program execution unit) executes robot program 1108 to generate command 146 instructing the behavior of robot 200. That is, robot program execution engine 152 sequentially executes robot program 1108 and transmits command 146 controlling robot 200 to one or more robot controllers 250. More specifically, robot program execution engine 152 includes a robot program interpretation module 154 and a command generation module 156.

Robot program interpretation module 154 sequentially reads and parses robot program 1108, and outputs the internal command obtained by the parsing to command generation module 156. Robot program interpretation module 154 can also interpret commands related to signal input/output, file access, and communication in addition to the commands related to the behavior of robot 200 described in the programming language included in robot program 1108.

Start, stop, and the like of reading of robot program 1108 by robot program interpretation module 154 may be controlled by command generation module 156.

Command generation module 156 generates commands 146 for each of robot controllers 250 in accordance with the internal command from robot program interpretation module 154.

Command generation module 156 functions as a host of one or more connected robot controllers 250. More specifically, command generation module 156 controls the start and stop of the execution of robot program 1108 in robot program interpretation module 154 and controls the start and stop of the generation of command 146 for robot controller 250 in accordance with the internal command exchanged with IEC program execution engine 150 and/or the internal command exchanged with support device 400 through external communication interface 164.

Command generation module 156 may collect information such as the state value and the error from robot controller 250.

A configuration example in which robot program interpretation module 154 and command generation module 156 are separated is illustrated for convenience of description, but these modules may be integrally mounted without being separated.

Communication control module 160 and communication driver 162 correspond to a communication unit that transmits command 146 to robot controller 250. Communication control module 160 and communication driver 162 transmit output value 142 from IEC program execution engine 150 and command 146 from robot program execution engine 152 to robot controller 250.

Communication control module 160 manages the data exchange with one or more connected robot controllers 250. Communication control module 160 may generate a communication instance managing the data communication for each connected robot controller 250, and manage the data communication using the generated communication instance.

Communication driver 162 is an internal interface that uses field network controller 108 (see FIG. 3) to perform the data communication with one or more connected robot controllers 250.

Each of robot controllers 250 includes a communication control module 280, a communication driver 282, a robot drive engine 284, and a signal output driver 292. Typically, these elements may be implemented by processor 262 (control processing circuit 260) of robot controller 250 executing robot system program 2702.

Communication control module 280 manages the data exchange with connected control device 100. Communication control module 280 may generate the communication instance managing the data communication with connected control device 100, and manage the data communication using the generated communication instance.

Communication driver 282 is an internal interface that uses field network controller 252 (see FIG. 4) to perform the data communication with connected control device 100.

Robot drive engine 284 executes the processing for driving robot 200 (including custom robot 200A and/or general-purpose robot 200B) of a control target in accordance with command 146 from control device 100. More specifically, robot drive engine 284 includes a management module 286, a target trajectory generation module 288, and a command value generation module 290.

Management module 286 corresponds to a processing execution unit that executes the processing in accordance with output value 142 from control device 100. More specifically, management module 286 manages the control mode, start/end of the generation of the target orbit from command 146, and the like in accordance with output value 142 from control device 100.

Target trajectory generation module 288 (target trajectory generation unit) generates a target trajectory of robot 200 (including custom robot 200A and/or general-purpose robot 200B) of the control target in accordance with command 146 from control device 100. Typically the generated target trajectory includes an hourly position of the distal end of robot 200 (the change in the position with respect to the time) and/or an hourly velocity of the distal end of robot 200 (the change in the velocity with respect to the time).

Target trajectory generation module 288 may output the generated target trajectory to command value generation module 290 (typically, the case of driving custom robot 200A in FIG. 4) or directly output the target trajectory to robot 200 through signal output driver 292 (typically, the case of driving general-purpose robot 200B in FIG. 5).

Command value generation module 290 sequentially generates the command values for driving robot 200 in accordance with command 146 from control device 100. More specifically, command value generation module 290 sequentially generates the command value for respective motors 230 constituting robot 200 of the control target in accordance with the target trajectory generated by target trajectory generation module 288. Command value generation module 290 may update the command value every predetermined control period or every predetermined event.

The control period of target trajectory generation module 288 of robot controller 250 is typically assumed to be about several hundred μsec to about several 100 msec, which is about the same as the control period of control device 100. On the other hand, it is assumed that the control period of command value generation module 290 of robot controller 250 is faster than the control cycle of target trajectory generation module 288 (for example, about several to several 10 times).

More specifically, command value generation module 290 calculates each command value given to motor 230 for driving robot 200 along the target trajectory based on kinematics of robot 200 of the control target. Command value generation module 290 calculates a target position (the change in the position/angle with respect to the time), a target speed (the change in the speed/angular velocity with respect to the time), a target acceleration (the change in acceleration/angular acceleration with respect to the time), and/or a target acceleration (the change in jerk/angular acceleration with respect to the time) as the command value given to motor 230.

Robot drive engine 284 may acquire a parameter required for calculating the target orbit and/or the command value with reference to setting information 2704 (see FIG. 4).

A configuration example in which target trajectory generation module 288 and command value generation module 290 are separated is illustrated for convenience of description, but these modules may be integrally mounted without being separated.

Signal output driver 292 is an internal interface outputting the command value and/or the target orbit to one or more connected drive circuits 220 and/or robot 200 using interface circuit 268 (see FIG. 4).

Figure 9:
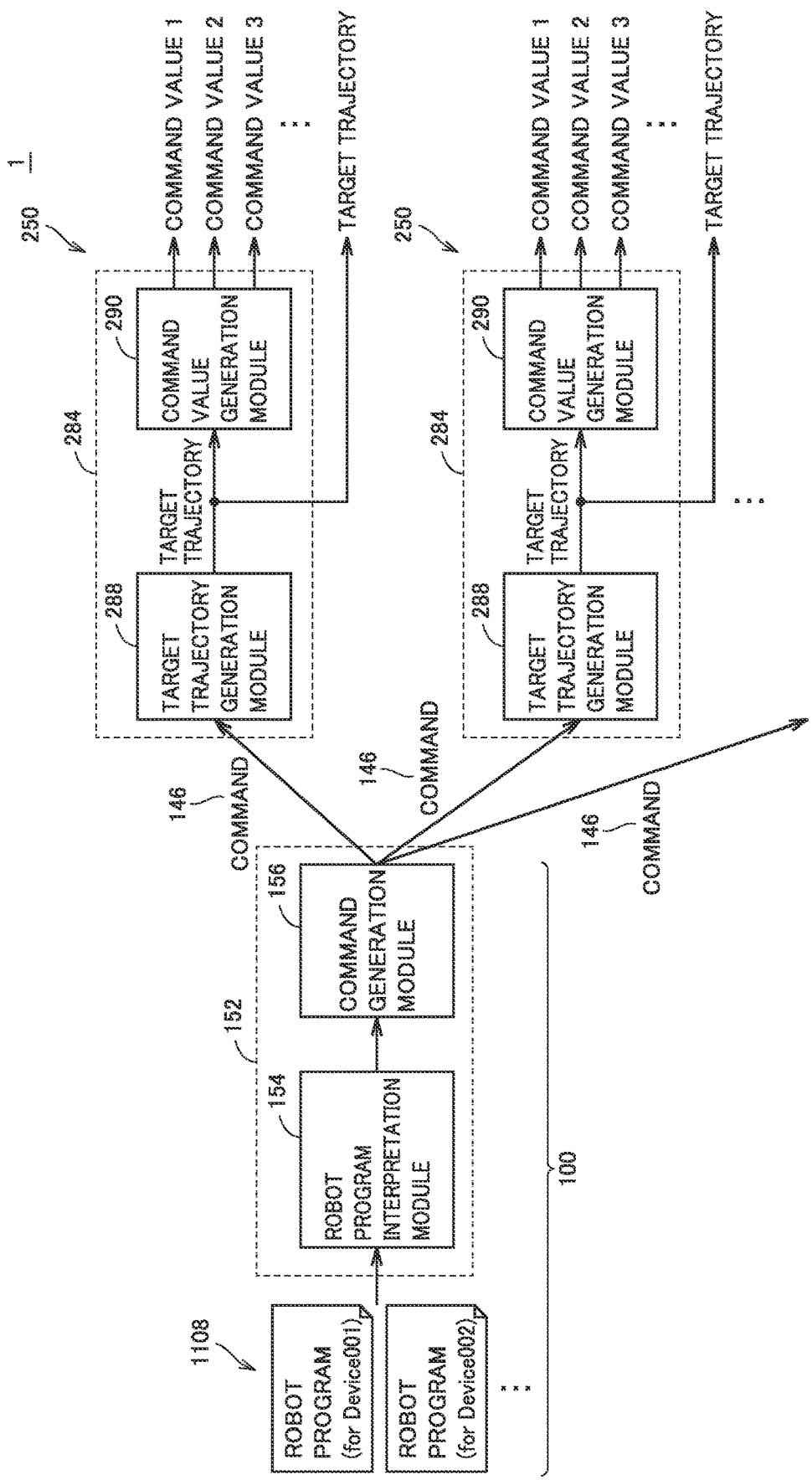
FIG. 9 is a schematic diagram schematically illustrating data processing for controlling the behavior of the robot in the robot control system of the embodiment.

FIG. 9 is a schematic diagram schematically illustrating data processing for controlling the behavior of robot 200 in robot control system 1 of the embodiment. Referring to FIG. 9, robot program 1108 described in a predetermined programming language is input to robot program execution engine 152 of control device 100.

For example, in a production facility in which the plurality of robots 200 are disposed in the same production line and each robot 200 performs different work, different robot program 1108 is input to robot program execution engine 152 for each robot 200. In addition, in a production facility in which the plurality of the same production lines are disposed in parallel, and robots 200 that perform the same work are disposed in the respective production lines, common robot program 1108 may be input to robot program execution engine 152. However, generated commands 146 may be independently transmitted to robot controller 250.

Furthermore, the plurality of robot programs 1108 described in different programming languages (for example, V+ language and G code) may be input to robot program execution engine 152. Robot program execution engine 152 can generate command 146 described in accordance with a common command system even when robot program 1108 described in a different programming language is input.

As described above, robot program execution engine 152 may be configured to be able to interpret a plurality of programming languages. In this case, robot program execution engine 152 may generate command 146 according to a predetermined command system without depending on the programming language.

Robot program execution engine 152 (robot program interpretation module 154) interprets input robot program 1108 to generate the internal command. Furthermore, robot program execution engine 152 (command generation module 156) generates command 146 controlling the behavior of robot 200 in accordance with the generated internal command.

Command 146 may be generated for one or more connected robot controllers 250. Generated command 146 is transmitted to corresponding robot controller 250 through field network 20 (see FIG. 2).

Target trajectory generation module 288 of robot controller 250 generates the target trajectory in accordance with command 146 from control device 100. The generated target trajectory may be output as it is to general-purpose robot 200B. That is, robot controller 250 may externally output the target trajectory.

On the other hand, command value generation module 290 of robot controller 250 generates the command value for each motor 230 constituting robot 200 of the control target in accordance with the generated target trajectory.

Any command system can be adopted as the command system that defines command 146. From the viewpoint of reducing the processing related to the generation of command 146, it is preferable to adopt a command group that can be easily generated from the command described in robot program 1108.

As illustrated in FIG. 9, in robot control system 1 of the embodiment, control device 100 generates command 146 from one or more robot programs 1108. Robot controller 250 drives robot 200 of the control target in accordance with generated command 146.

E. Processing Executed by Control Device 100

As described above, robot program 1108 is the program controlling the behavior of robot 200. However, for example, timing to start/stop the operation of robot 200, a condition for operating robot 200 (for example, cooperation with the facility in a preceding process or a subsequent process), and a safety condition related to robot 200 are required to be controlled in order to control the behavior of robot 200.

Accordingly, in the control device 100, not only robot program 1108 but also IEC program 1104 may be executed in parallel. IEC program 1104 may include logic or the like that collects the state value related to the operation of robot 200 to determine the timing to start/stop the operation of robot 200.

Figure 10:
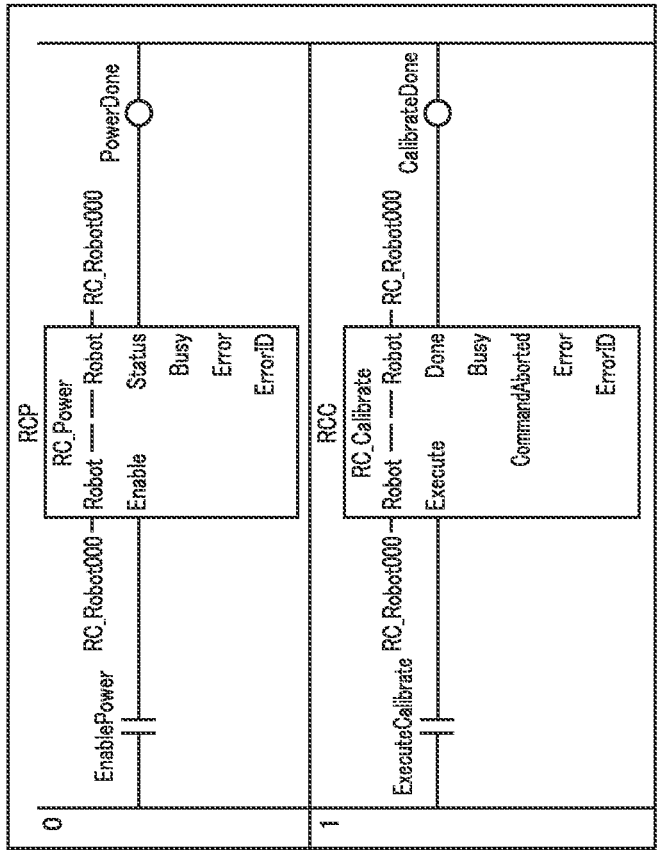
FIG. 10 is a view illustrating an example of an IEC program and a robot program that are executed by the control device constituting the robot control system of the embodiment.

FIG. 10 is a view illustrating an example of IEC program 1104 and robot program 1108 executed by control device 100 constituting robot control system 1 according to the present embodiment.

FIG. 10(A) illustrates an example of IEC program 1104 described in a ladder diagram (LD language). The example of IEC program 1104 in FIG. 10(A) includes a command related to processing for turning on the power of control target robot 200 and processing for executing calibration of control target robot 200.

As illustrated in FIG. 10(A), IEC program 1104 may include a function block as an element. Furthermore, IEC program 1104 may include a code described in structured text (ST language).

FIG. 10(B) illustrates an example of robot program 1108 described in V+ language. As illustrated in FIG. 10(B), the V+ language is a kind of high-level language controlling the behavior of robot 200.

Parallel execution of IEC program 1104 and robot program 1108 in control device 100 will be described below.

Figure 11:
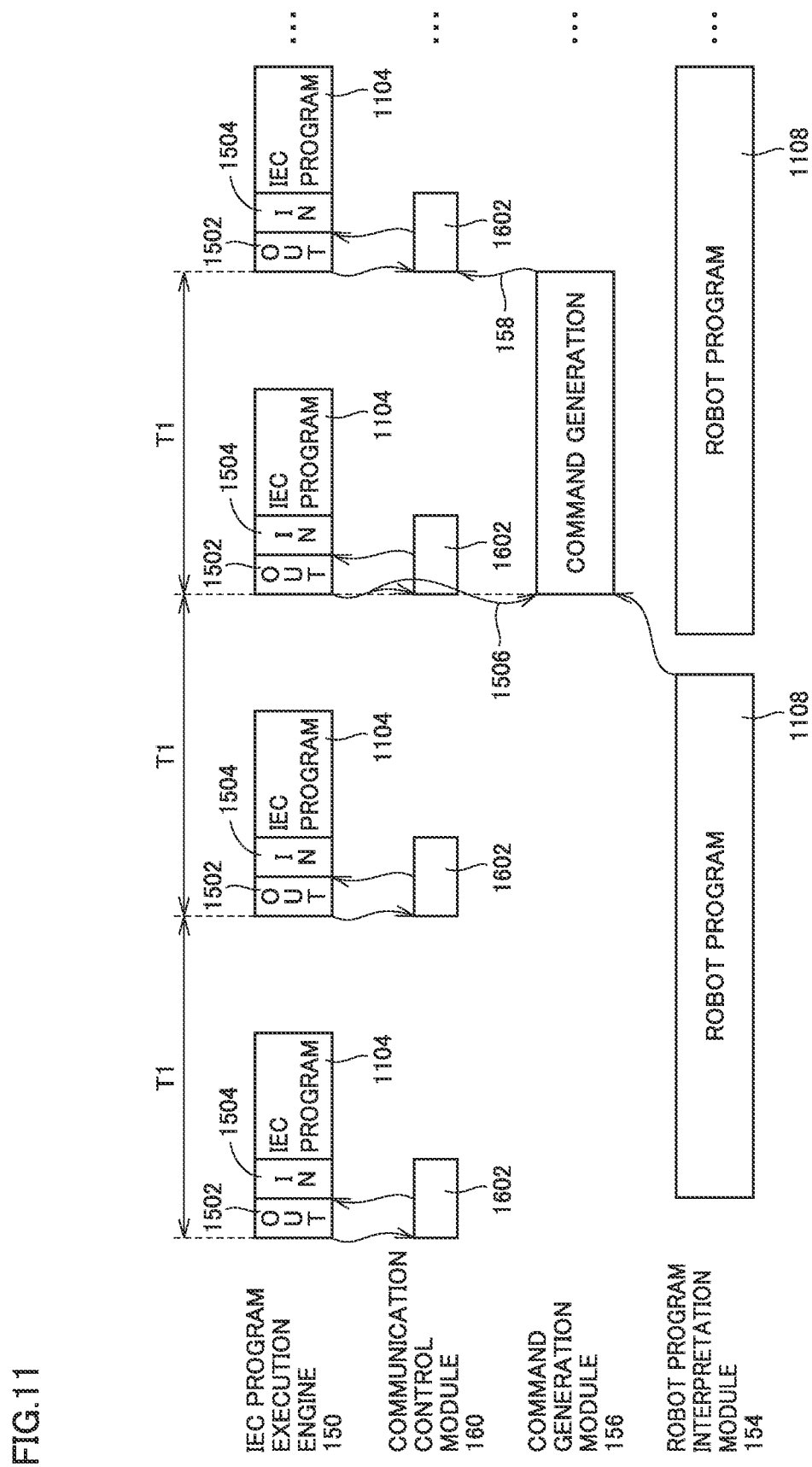
FIG. 11 is a time chart illustrating an execution example of a program in the control device constituting the robot control system of the embodiment.

FIG. 11 is a time chart illustrating an execution example of a program in control device 100 constituting robot control system 1 according to the present embodiment. As illustrated in FIG. 11, in control device 100, IEC program execution engine 150 and robot program execution engine 152 (robot program interpretation module 154 and command generation module 156) independently execute the processing.

IEC program execution engine 150 cyclically executes (repeatedly executes) IEC program 1104 every predetermined control period T1. The cyclic execution of IEC program 1104 includes output update processing 1502 and input update processing 1504.

Output update processing 1502 includes processing for reflecting output value 142 determined by the execution of IEC program 1104 on the internal variable and/or the target device. In particular, output value 142 for a device connected through field network 20 is stored in a communication frame and transmitted onto field network 20.

Input update processing 1504 includes processing for acquiring input value 144 (state value) necessary for the execution of IEC program 1104 from the internal variable and/or the target device. In particular, input value 144 from the device connected through field network 20 are obtained from the communication frame propagating on field network 20.

Communication control module 160 sends the communication frame onto field network 20 in synchronization with control period T1, and receives the communication frame circulating on field network 20 and returning. Communication control module 160 stores the output value 142 generated by IEC program execution engine 150 and/or command 146 generated by command generation module 156 in the communication frame, and holds input value 144 (state value) included in the returned communication frame such that IEC program execution engine 150 and command generation module 156 can refer to the input value.

Command generation module 156 generates command 146 in accordance with the internal command from robot program interpretation module 154. Typically, the timing at which command generation module 156 generates command 146 is determined by output value 142 from IEC program execution engine 150. The example in FIG. 11 illustrates an example in which command generation module 156 generates command 146 in response to output value 142 from IEC program execution engine 150. The generation of command 146 by command generation module 156 may be synchronized with the timing of output update processing 1502 of IEC program execution engine 150.

Robot program interpretation module 154 typically executes robot program 1108 independently of control period T1. The start/stop of the execution of robot program 1108 by robot program interpretation module 154 may be controlled by command generation module 156.

As illustrated in FIG. 11, robot program execution engine 152 sequentially executes robot program 1108. IEC program execution engine 150 cyclically executes IEC program 1108 independently of the execution of robot program 1104 by robot program execution engine 152.

F. Data Exchange

The data exchanged between control device 100 and one or more robot controllers 250 will be described below.

Figure 12:
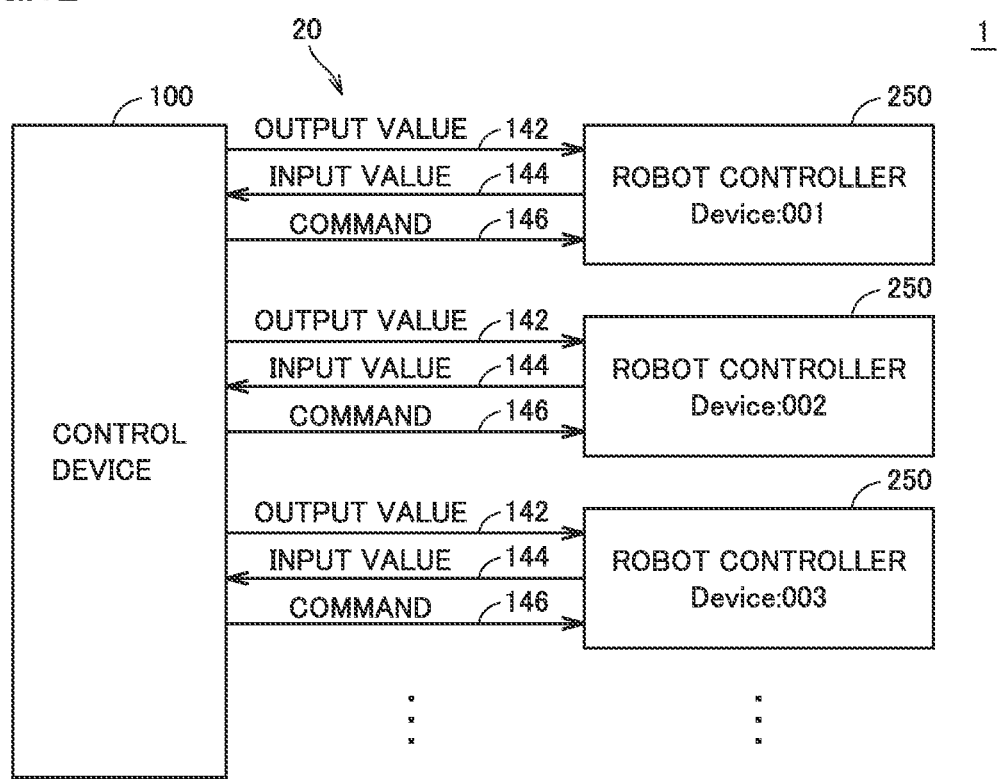
FIG. 12 is a view illustrating data exchange in the robot control system of the embodiment.

FIG. 12 is a view illustrating the data exchange in robot control system 1 of the embodiment. Referring to FIG. 12, output value 142, input value 144, and command 146 are exchanged between control device 100 and each of robot controllers 250 through field network 20. Output value 142 and command 146 are transmitted from control device 100 to robot controller 250, and input value 144 is transmitted from robot controller 250 to control device 100.

Basically, output value 142, input value 144, and command 146 are data independent of each other for each robot controller 250. Therefore, as the number of robots 200 (robot controllers 250) connected to control device 100 increases, more communication resources are required.

On the other hand, the transmission capacity of field network 20 is limited. For this reason, when the number of robots 200 connected to control device 100 increases to reach an allowable transmission capacity, no more robots 200 can be connected.

As described above, because the number of robots 200 (robot controllers 250) connectable to control device 100 is limited to the transmission capacity of field network 20, the communication resource allocated to each robot controller 250 is preferably optimized.

An example of a method for transmitting the data through field network 20 will be described below. When EtherCAT is adopted as field network 20, the communication frame storing various types of information periodically circulate between the devices. By adopting such the communication frame, synchronized data can be exchanged between the devices connected to field network 20.

Figure 13:
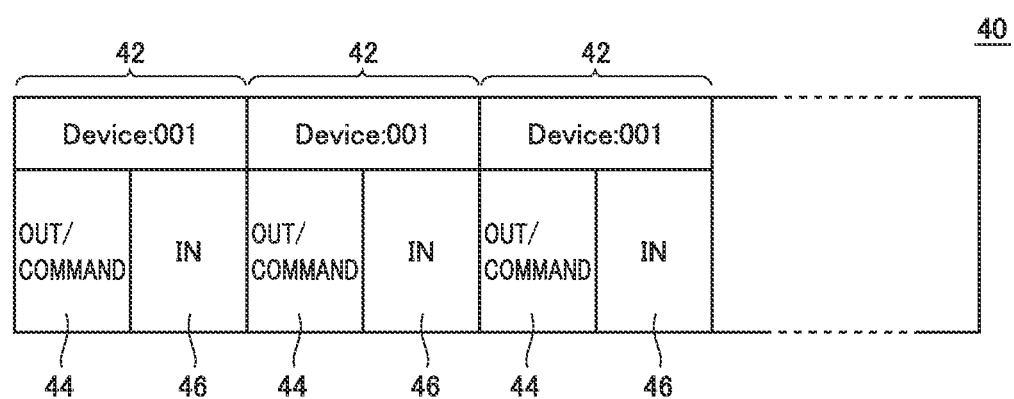
FIG. 13 is a schematic diagram illustrating an example of a communication frame used in the robot control system of the embodiment.

FIG. 13 is a schematic diagram illustrating an example of communication frame 40 used in robot control system 1 of the embodiment. Referring to FIG. 13, as an example, communication resource 42 is allocated to each device (in the configuration example in FIG. 2, for each robot controller 250) connected to field network 20 in communication frame 40. Each communication resource 42 includes an output value area 44 and an input value area 46.

In output value area 44, the data is written by control device 100 and read by the corresponding device. More specifically, output value 142 generated by control device 100 (IEC program execution engine 150) and/or command 146 generated by control device 100 (robot program execution engine 152) are stored in output value area 44.

In input value area 46, the data is written by the corresponding device, and read by control device 100. More specifically, information (for example, the state value related to the drive of robot 200) included in each robot controller 250 is written in input value area 46. Examples of the state value related to the drive of robot 200 include the current position, the speed record, the acceleration record, and the torque record of the distal end and each axis of target robot 200. As described above, the communication unit of robot controller 250 transmits the state value related to the drive of robot 200 to control device 100 using input value area 46.

The data is exchanged between control device 100 and one or more robot controllers 250 through communication frame 40 in FIG. 13.

G. Communication Resource Setting Function

Some methods related to the setting and management of the communication resource exchanging the data between control device 100 and one or more robot controllers 250 will be described below. That is, some specific examples of the processing for allocating the communication resource to each robot controller 250 (corresponding to communication resource setting function 30 in FIG. 1) will be described.

g1: Previous Setting to Communication Master

In the configuration example of FIG. 2, it is assumed that field network controller 108 of control device 100 functions as the communication master of field network 20. In such the configuration, the allocation of the communication resource to each device connected to field network 20 may be performed, for example, field network controller 108 of control device 100 may be performed in accordance with the allocation setting included in setting information 1106 (see FIG. 3). That is, field network controller 108 of control device 100 may implement communication resource setting function 30.

Figure 14:
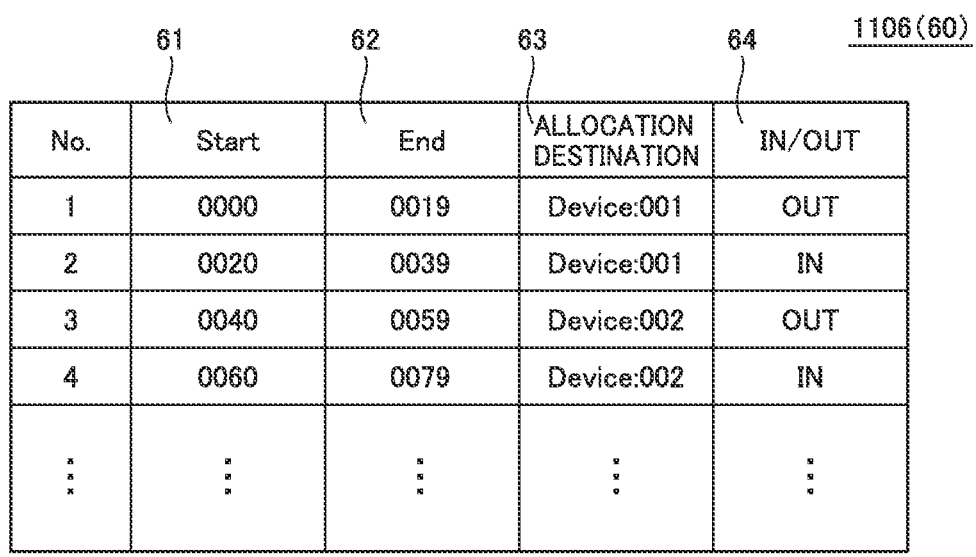
FIG. 14 is a view illustrating an example of an assignment setting included in setting information used in the robot control system of the embodiment.

FIG. 14 is a view illustrating an example of an allocation setting 60 included in setting information 1106 used in robot control system 1 of the embodiment. Referring to FIG. 14, setting information 1106 includes an entry corresponding to each allocated communication resource. Each entry includes a beginning address 61, a final address 62, identification information 63 of an allocation destination device, and a use type 64 of the allocated communication resource.

Beginning address 61 and final address 62 are defined using an address allocated to a data size that can be stored in one communication frame 40. A region from beginning address 61 to final address 62 of each entry is allocated as one independent communication resource. Each communication resource is allocated to the device specified by identification information 63, and whether it is an area storing output value 142 (or command 146) or an area storing input value 144 is determined by corresponding use type 64.

As described above, the communication master (control device 100) of field network 20 may determine the allocation of the communication resource to each device using predetermined allocation setting 60. That is, communication resource setting function 30 may be implemented in field network controller 108 of control device 100 that is the communication master. Communication resource setting function 30 determines the communication resource allocated to each robot controller 250 in accordance with predetermined allocation setting 60.

g2: Setting of Communication Resource Using Allocation Pattern

The communication resource may be set using the assignment pattern instead of the explicit allocation setting as illustrated in FIG. 14.

Figure 15:
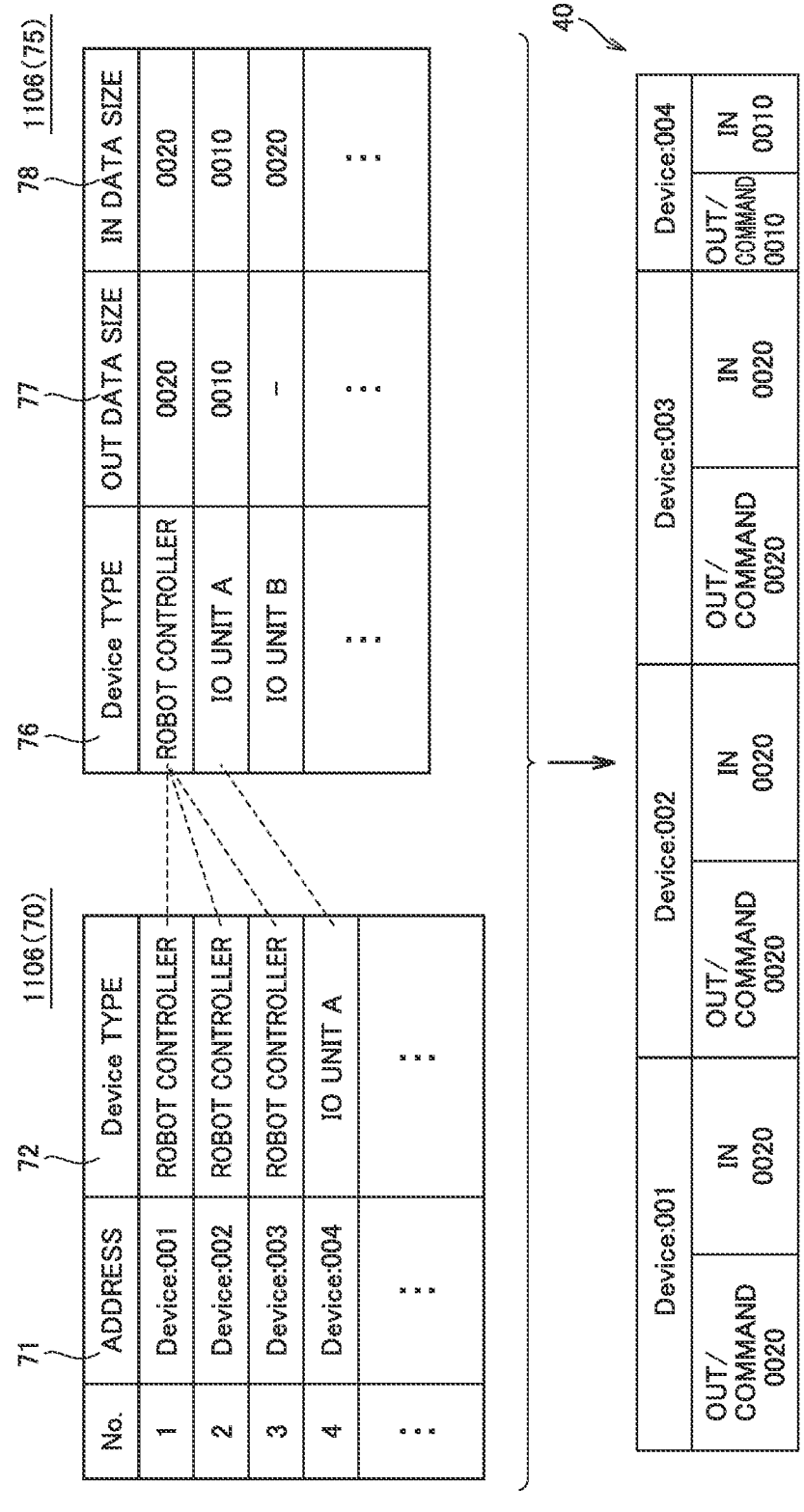
FIG. 15 is a view illustrating setting of a communication resource using an allocation pattern used in the robot control system of the embodiment.

FIG. 15 is a view illustrating the setting of the communication resource using the allocation pattern used in robot control system 1 of the embodiment. Referring to FIG. 15, setting information 1106 includes connection information 70 indicating the device type connected for each address and an allocation pattern 75 indicating the communication resource allocated for each device.

Connection information 70 includes information indicating the connected device for each device connected to field network 20. More specifically, connection information 70 includes the entry corresponding to the address. Each entry includes an address 71 and a device type 72. Address 71 is identification information uniquely defined on field network 20. Device type 72 indicates the type of the connected device.

Allocation pattern 75 includes information about the communication resource allocated to each device. More specifically, allocation pattern 75 includes the entry indicating the communication resource corresponding to each device. Each entry includes a device type 76, a data size 77 of the output value area in which the output value or the command is stored, and a data size 78 of the input value area in which the input value is stored.

The communication master (field network controller 108 of control device 100 in FIG. 2) of field network 20 determines the allocation of the communication resource based on connection information 70 and allocation pattern 75. More specifically, after connection information 70 is referred to specify the type and number of the device connected to field network 20, allocation pattern 75 is referred to sequentially allocate the data size corresponding to each device. Through the above processing, the data structure of communication frame 40, namely, the communication resource can be determined.

As described above, communication resource setting function 30 may be implemented in field network controller 108 of control device 100 that is the communication master. Communication resource setting function 30 determines the communication resource allocated to each robot controller 250 based on connection information 70 and allocation pattern 75. At this point, communication resource setting function 30 may determine the communication resource allocated to each robot controller 250 depending on the number of robot controllers 250 network-connected to control device 100 defined in connection information 70.

g3: Previous Setting by Support Device 400

A mechanism by which the user can easily set the setting of the communication resource for each device may be provided. Typically, support device 400 connected to control device 100 may provide a user interface screen setting the communication resource.

Figure 16:
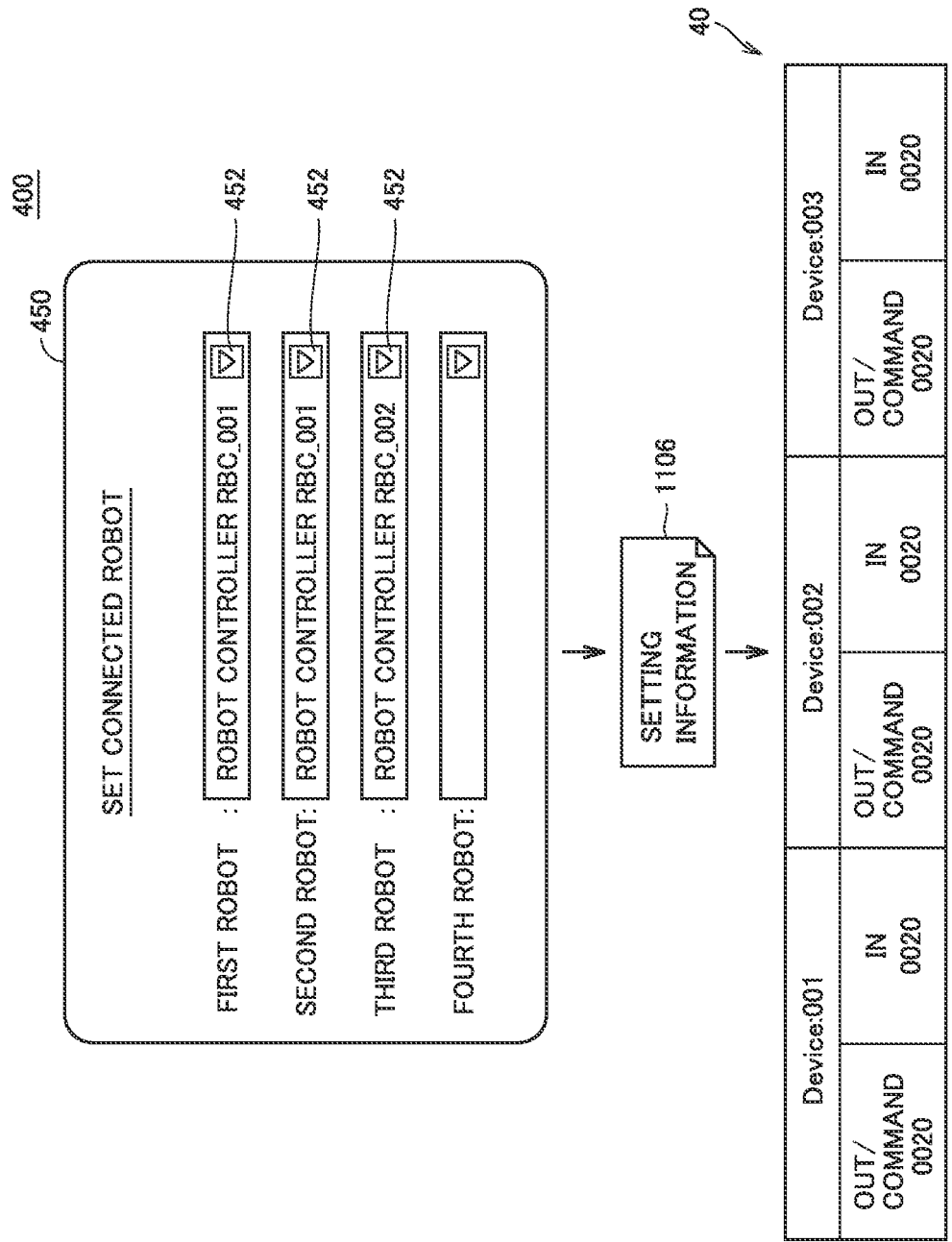
FIG. 16 is a view illustrating setting of the communication resource using the support device in the robot control system of the embodiment.

FIG. 16 is a view illustrating the setting of the communication resource using support device 400 in robot control system 1 of the embodiment. Referring to FIG. 16, support device 400 provides a setting screen 450. Setting screen 450 in FIG. 16 is typically provided by processor 402 of support device 400 executing development program 4104.

The user performs various settings on setting screen 450 to generate setting information 1106. Setting information 1106 is transferred to control device 100. As a result, the data structure of communication frame 40, namely, the communication resources is determined.

More specifically, setting screen 450 includes a setting field 452 in which robot 200 (robot controller 250) connected to field network 20 is registered. The user inputs information specifying robot 200 (robot controller 250) included in robot control system 1 to setting field 452 of setting screen 450.

Support device 400 generates setting information 1106 based on the information set on setting screen 450. Setting information 1106 may include allocation setting 60 illustrated in FIG. 14.

The communication master (field network controller 108 of control device 100 in FIG. 2) of field network 20 refers to setting information 1106 generated by support device 400 to determine the data structure of communication frame 40, namely, the communication resource.

As described above, support device 400, which is an example of the external device determining the setting related to the allocation of the communication resource by communication resource setting function 30, may be further prepared in accordance with the user operation.

As described above, because the transmission capacity of field network 20 is limited, when the number of robots 200 (robot controllers 250) connected to field network 20 is too large, the communication resource cannot be appropriately set. In this case, a user interface screen allowing the user to select another measure may be provided.

Figure 17:
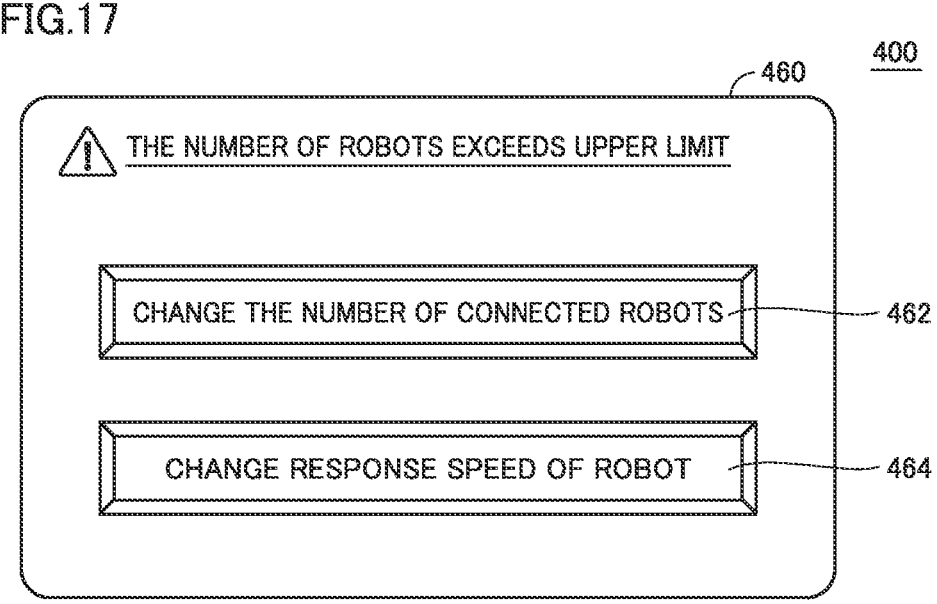
FIG. 17 is a view illustrating a procedure in the case where the communication resource cannot be appropriately set in the robot control system of the embodiment.

FIG. 17 is a view illustrating a procedure in the case where the communication resource cannot be appropriately set in robot control system 1 of the embodiment. When robot 200 (robot controller 250) exceeding the limit is set on setting screen 450 in FIG. 16, support device 400 provides setting screen 460 in FIG. 17.

Setting screen 460 in FIG. 17 is typically provided by processor 402 of support device 400 executing development program 4104.

Setting screen 460 includes a message notifying that the set number of robots 200 (robot controllers 250) exceeds the limit, and includes a button 462 instructing an operation to change the number of connected robots and a button 464 instructing an operation to change the response speed of robot 200 as options.

When the user selects button 462, support device 400 displays setting screen 450 in FIG. 16, and the user changes the number of connected robots 200 so as to be within the limit.

On the other hand, when the user selects button 464, the data size of communication frame 40 propagating through field network 20 may be increased. However, when the data size of communication frame 40 is enlarged, the period in which communication frame 40 circulates through field network 20 becomes long. Accordingly, the period in which the data is updated between control device 100 and each device becomes relatively long.

As described above, communication resource setting function 30 may adjust the size of the communication resource by changing the length of communication frame 40 transmitted on field network 20, or by changing the communication period of communication frame 40 transmitted on the field network 20.

Alternatively, when the user selects button 464, the data size allocated to each device may be reduced while the data size of entire communication frame 40 is maintained. In this case, because the data size that can be propagated by one communication frame 40 is decreased, for example, when command 146 is transmitted to the specific device, the command may be divided into a plurality of communication frames 40 and transmitted.

For example, because command 146 is previously transmitted from control device 100 to robot controller 250, a certain transmission delay of command 146 is permitted. Consequently, even when one command 146 is transmitted using the plurality of communication frames 40, there are few problems in controlling robot 200.

Figure 18:
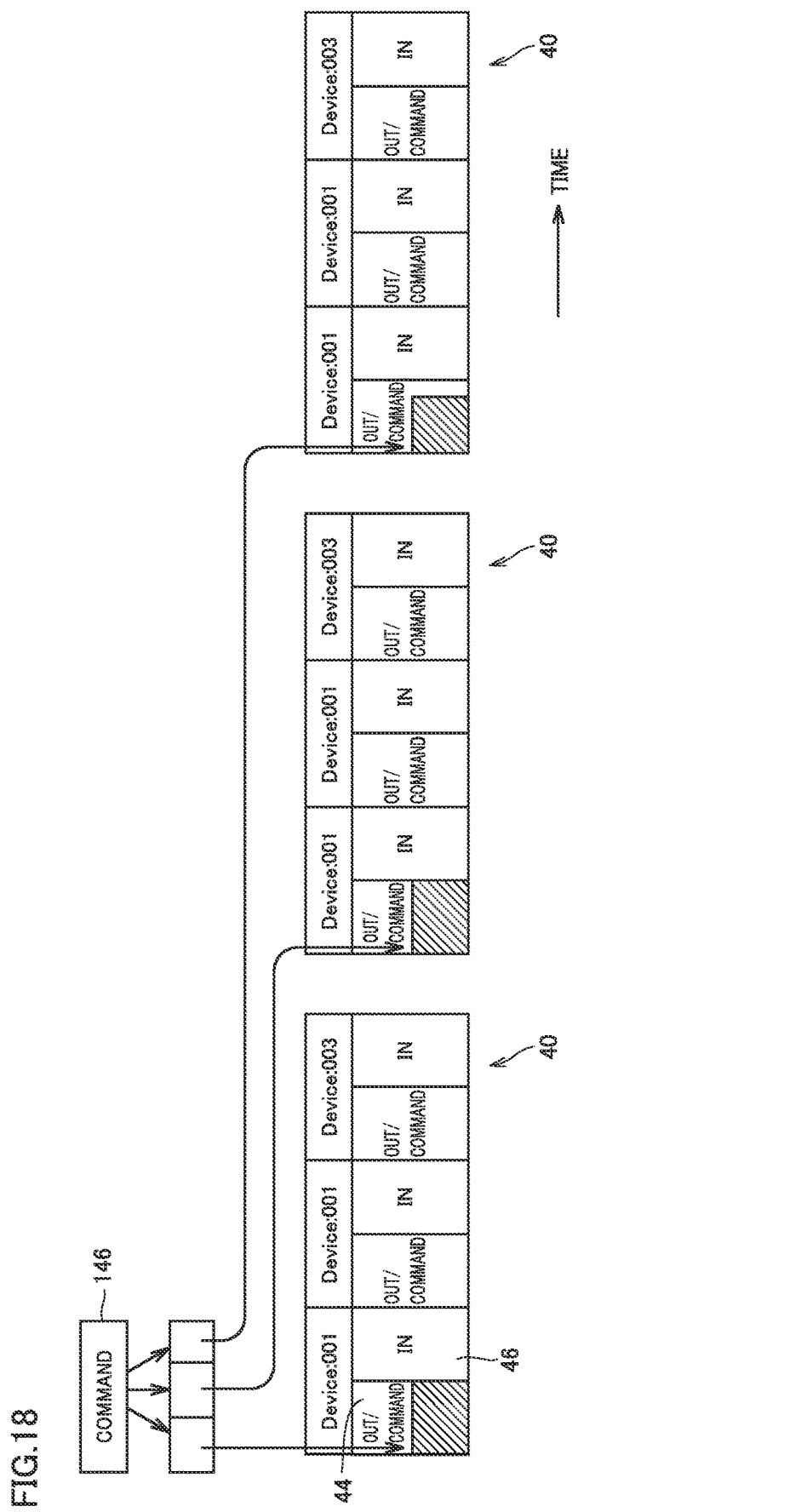
FIG. 18 is a view illustrating a processing example of dividing a command into a plurality of communication frames 40 and transmitting the divided command in the robot control system of the embodiment.

FIG. 18 is a view illustrating a processing example of dividing command 146 into the plurality of communication frames 40 and transmitting the divided command in robot control system 1 of the embodiment. Referring to FIG. 18, a data string of command 146 is divided into sizes that fit in output value area 44, and stored in the plurality of temporally consecutive communication frames 40.

The example in FIG. 18 illustrates an example in which command 146 is transmitted using three communication frames 40. Robot controller 250 restores command 146 by acquiring and combining the divided data from the plurality of communication frames 40.

As described above, even when the data size allocated to each device in one communication frame 40 is relatively small, command 146 can be transmitted to target robot controller 250 by adopting the function of dividing and transmitting command 146 using the plurality of communication frames 40 as needed.

g4: Dynamic Setting

In the above description, the case where the communication resource is statically set has been described. However, the communication resource may be dynamically set or changed. An example of dynamic setting of the communication resource will be described below.

For example, an aspect in which any one of robots 200 included in robot control system 1 is tuned or initialized, or an aspect in which any one of robots 200 is intensively monitored is also assumed. In such the aspect, preferably the distal end of target robot 200, the position of each axis, and the like is collected for each control period, and more communication resources may be temporarily allocated.

Figure 19:
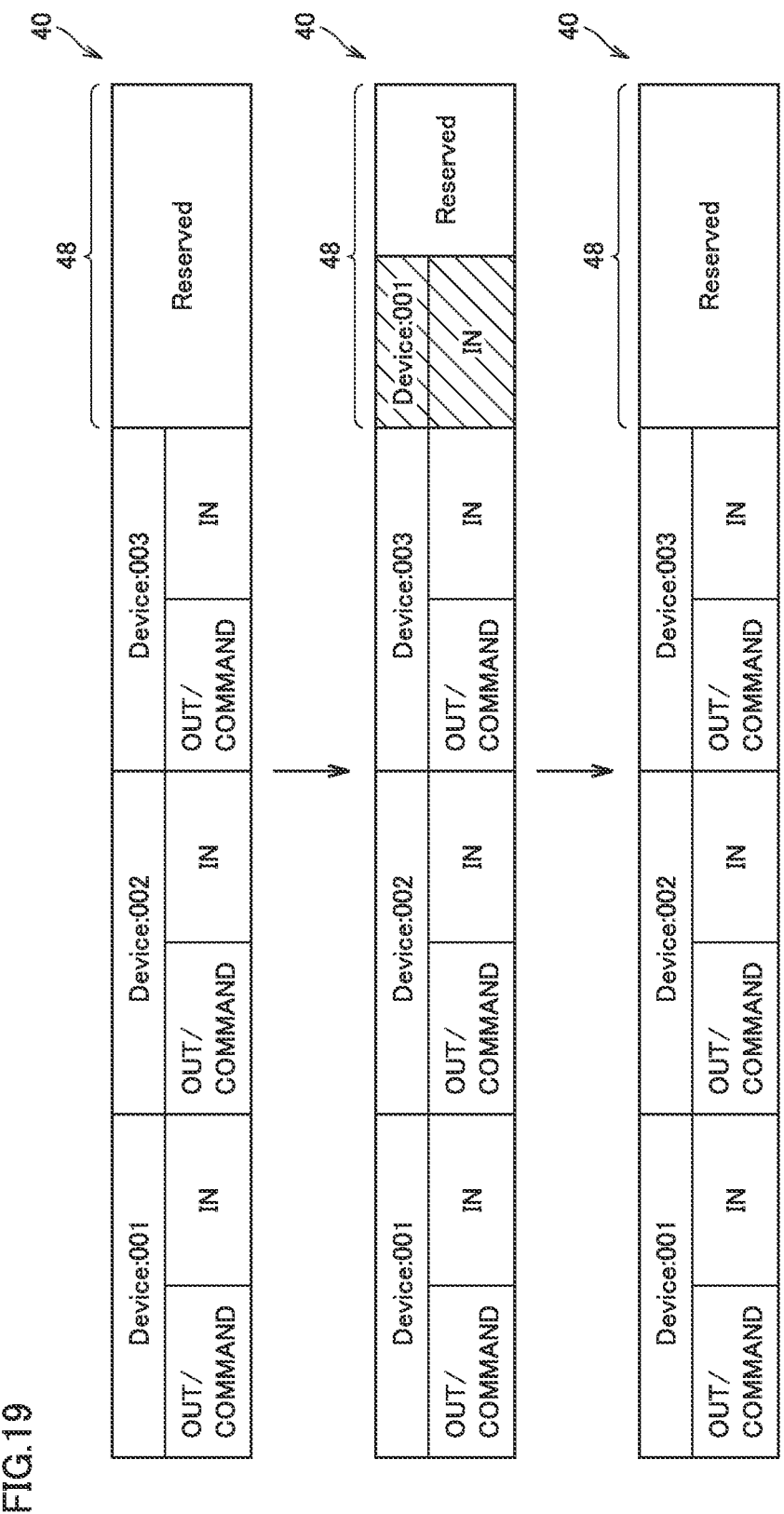
FIG. 19 is a view illustrating an example of dynamic setting of the communication resource in the robot control system of the embodiment.

FIG. 19 is a view illustrating an example of the dynamic setting of the communication resource in robot control system 1 of the embodiment. Referring to FIG. 19, communication frame 40 may include a reserve resource 48, and reserve resource 48 may be used by any device connected to field network 20. FIG. 19 illustrates an example in which a part of reserve resource 48 is allocated to the device of an address "001" as the input value area.

Figure 20:
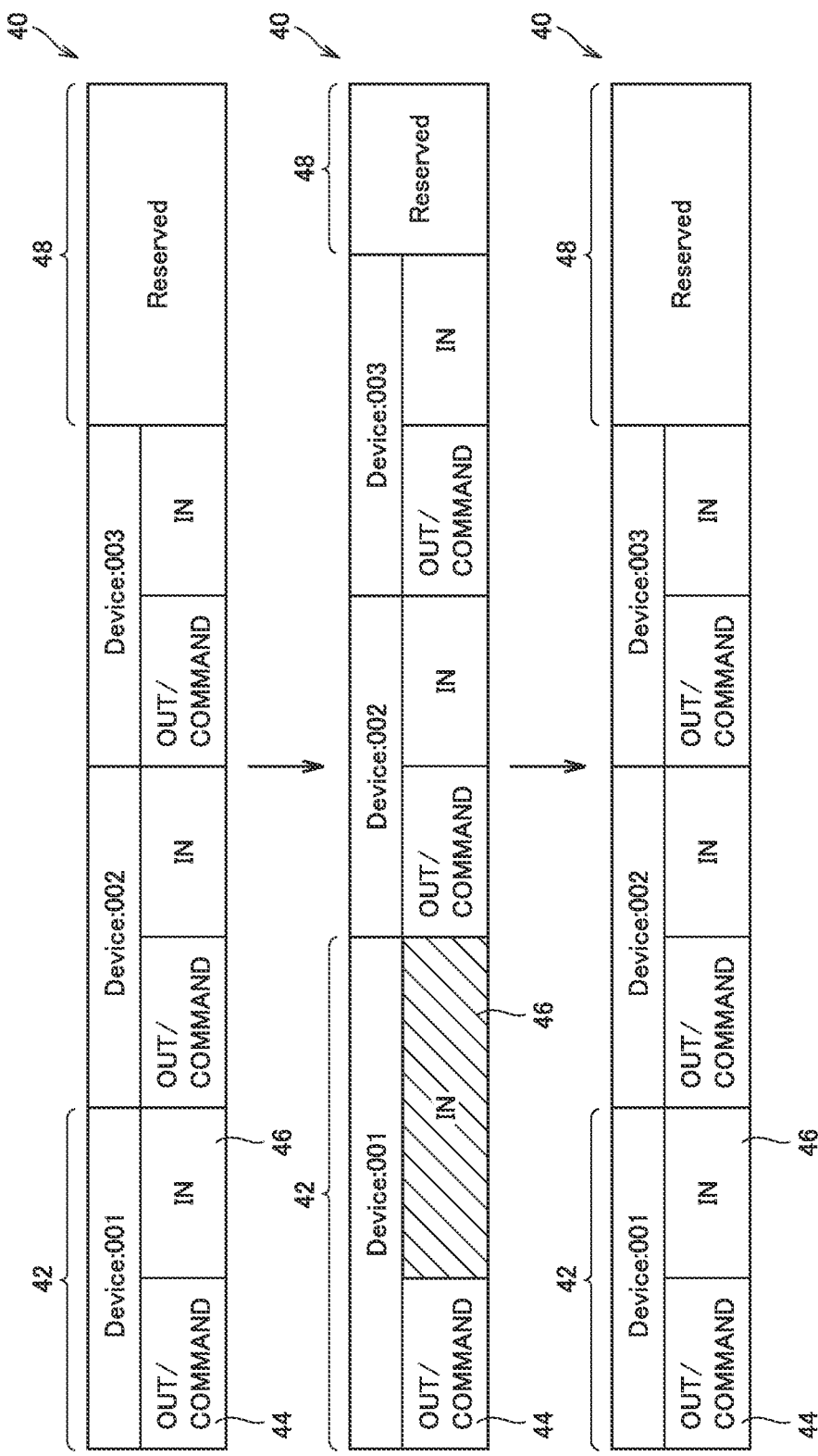
FIG. 20 is a view illustrating another example of the dynamic setting of the communication resource in the robot control system of the embodiment.

FIG. 20 is a view illustrating another example of the dynamic setting of the communication resource in robot control system 1 of the embodiment. Referring to FIG. 20, communication frame 40 may include reserve resource 48, and the data sizes of output value area 44 and input value area 46 may be dynamically changed using reserve resource 48 as a buffer. FIG. 20 illustrates an example of enlarging the data size of input value area 46 in communication resources 42 allocated to the device of the address "001". Input value area 46 can be enlarged up to the data size of reserve resource 48.

As illustrated in FIGS. 19 and 20, in the case where the input value such as the state value from the specific device is required to be temporarily collected, the communication master (control device 100) of field network 20 may change the setting of the communication resource.

FIGS. 19 and 20 illustrate the example of changing the communication resource for the specific device, but the communication resource may be changed simultaneously for a plurality of devices. In addition, FIGS. 19 and 20 illustrate the example of changing the data size of input value area 46, but the data size of output value area 44 may be changed or the data size of both output value area 44 and input value area 46 may be changed.

Furthermore, FIGS. 19 and 20 illustrate the example in which reserve resource 48 is provided in communication frame 40, but the communication standby allocated to each device may be dynamically changed depending on the situation without providing reserve resource 48.

In order to implement the dynamic setting of the communication resource in FIGS. 19 and 20, communication resource setting function 30 may be implemented in field network controller 108 of control device 100 that is the communication master. Then, the communication resources may be appropriately switched based on a variable (state value) held and managed by any one of robot controllers 250. As described above, communication resource setting function 30 may determine the communication resource allocated to each robot controller 250 depending on at least one operation state of the one or more robot controllers 250.

H. Appendix

The above embodiment includes the following technical ideas.

Configuration 1

A robot control system (1) comprising:

a first control device (100) comprising a first communication unit (108, 160, 162);

one or more second control devices (250) network-connected to the first control device, each of the second control devices comprising:

a second communication unit (252, 280, 282) configured to exchange data with the first communication unit of the first control device using a communication resource of a network (20) allocated thereto, and a command value generation unit (290) configured to sequentially generate a command value for driving a robot (200), in accordance with a command (146) from the first control device; and a communication resource setting unit (30) configured to allocate the communication resource to each second control device.

Configuration 2

The robot control system described in the configuration 1, wherein the communication resource setting unit is configured to determine the communication resource allocated to each second control device in accordance with a predetermined allocation setting (60).

Configuration 3

The robot control system described in the configuration 1 or 2, wherein the communication resource setting unit is configured to determine the communication resource allocated to each second control device depending on a number of the second control devices connected to the first control device through the network.

Configuration 4

The robot control system described in any one of the configurations 1 to 3, wherein the communication resource setting unit determines the communication resource allocated to each second control device according to an operation state of at least one of the one or more second control devices.

Configuration 5

The robot control system described in any one of the configurations 1 to 4, wherein the communication resource setting unit is implemented in the first communication unit of the first control device.

Configuration 6

The robot control system described in any one of the configurations 1 to 5, wherein the second communication unit of the second control device is configured to transmit a state value related to drive of the robot to the first control device.

Configuration 7

The robot control system described in any one of the configurations 1 to 6, further including an external device (400) configured to determine a setting related to allocation of the communication resource by the communication resource setting unit in accordance with a user operation.

Configuration 8

The robot control system described in any one of the configurations 1 to 6, wherein the communication resource setting unit is configured to adjust a size of the communication resource by changing a length of a communication frame transmitted on the network.

Configuration 9

The robot control system described in any one of the configurations 1 to 6, wherein the communication resource setting unit is configured to adjust a size of the communication resource by changing a communication period of a communication frame transmitted on the network.

Configuration 10

A control method in a robot control system (1) comprising a first control device (100) with a first communication unit (108, 160, 162) and one or more second control devices (250) network-connected to the first control device, the control method including:

allocating (30) a communication resource of a network (20) to each second control device;

exchanging, by each second control device, data with the first control device using the communication resource allocated to each second control device; and generating (290) sequentially, by each second control device, a command value for driving a robot in accordance with a command from the first control device.

1. Advantages

In the robot control system 1 of the embodiment, the communication resource can be appropriately allocated to each robot controller 250 that controls robot 200. As a result, the control performance can be maintained even when the plurality of robot controllers 250 are connected to field network 20.

It should be considered that the disclosed embodiment is an example in all respects and not restrictive. The scope of the present invention is defined by not the above description, but the claims, and it is intended that all modifications within the meaning and scope of the claims are included in the present invention.

REFERENCE SIGNS LIST

1: robot control system, 12: higher-order network, 20: field network, 30: communication resource setting function, 40: communication frame, 42: communication resource, 44: output value region, 46: input value region, 48: reserve resource, 60: assignment setting, 61: head address, 62: final address, 63: identification information, 64: usage type, 70: connection information, 71: address, 72, 76: device type, 75: assignment pattern, 77, 78: data size, 100: control device, 101, 251: communication unit, 102, 262, 362, 402: processor, 104, 266, 366, 404: main memory, 106: higher-order network controller, 108, 252, 352: field network controller, 109, 253, 353: counter, 110, 270, 410: storage, 112: memory card interface, 114: memory card, 116: local bus controller, 118, 418: processor bus, 120, 420: USB controller, 122: local bus, 130: functional unit, 142: output value, 144: input value, 146: command, 150: IEC program execution engine, 152: robot program execution engine, 154: robot program interpretation module, 156: command generation module, 160, 280: communication control module, 162, 282: communication driver, 164: external communication interface, 200: robot, 200A: custom robot, 200B: general-purpose robot, 210: arm unit, 220: drive circuit, 230: motor, 250: robot controller, 260, 360: control processing circuit, 268, 368: interface circuit, 284: robot drive engine, 286: management module, 288: target trajectory generation module, 290: command value generation module, 292: signal output driver, 300: operation pendant, 370: firmware, 380: operation key group, 400: support device, 406: input unit, 408: display unit, 412: optical drive, 414: storage medium, 422: communication controller, 450, 460: setting screen, 452: setting field, 462, 464: button, 500: display device, 600: server device, 1102: system program, 1104: IEC program, 1106, 2704: setting information, 1108: robot program, 1502: output update processing, 1504: input update processing, 2702: robot system program, 4104: development program, T1: control period

The invention claimed is:

1. A robot control system comprising:
   a first control device comprising a first communication unit;
   one or more second control devices network-connected to the first control device;
   a communication resource setting unit configured to allocate to each second control device a communication resource within a communication frame of a network,
   wherein, each of the one or more second control devices comprises:
      a second communication unit configured to exchange data with the first communication unit of the first control device using the communication resource allocated thereto, and
      a command value generation unit configured to sequentially generate a command value for driving a robot, in accordance with a command from the first control device.

2. The robot control system according to claim 1, wherein the communication resource setting unit is configured to determine the communication resource allocated to each second control device in accordance with a predetermined allocation setting.

3. The robot control system according to claim 1, wherein the communication resource setting unit is configured to determine the communication resource allocated to each second control device depending on a number of the one or more second control devices connected to the first control device through the network.

4. The robot control system according to claim 1, wherein the communication resource setting unit is configured to determine the communication resource allocated to each second control device depending on an operation state of at least one of the one or more second control devices.

5. The robot control system according to claim 1, wherein the communication resource setting unit is implemented in the first communication unit of the first control device.

6. The robot control system according to claim 1, wherein the second communication unit of the second control device is configured to transmit a state value related to drive of the robot to the first control device.

7. The robot control system according to claim 1, further comprising an external device configured to determine a setting related to allocation of the communication resource by the communication resource setting unit in accordance with a user operation.

8. The robot control system according to claim 1, wherein the communication resource setting unit is configured to adjust a size of the communication resource by changing a length of the communication frame transmitted on the network.

9. The robot control system according to claim 1, wherein the communication resource setting unit is configured to adjust a size of the communication resource by changing a communication period of the communication frame transmitted on the network.

10. The robot control system according to claim 1, wherein the communication frame is transmitted through the network.

11. A robot control method in a robot control system comprising a first control device with a first communication unit and one or more second control devices network-connected to the first control device, the control method comprising:
    allocating to each second control device a communication resource within a communication frame of the network;
    exchanging, by each second control device, data with the first control device using the communication resource allocated to the second control device; and
    generating sequentially, by each second control device, a command value for driving a robot in accordance with a command from the first control device.

12. The robot control method according to claim 11, wherein the allocating the communication resource comprises determining the communication resource allocated to each second control device in accordance with a predetermined allocation setting.

13. The robot control method according to claim 11, wherein the allocating the communication resource comprises determining the communication resource allocated to each second control device depending on a number of the one or more second control devices connected to the first control device through the network.

14. The robot control method according to claim 11, wherein the allocating the communication resource comprises determining the communication resource allocated to each second control device depending on an operation state of at least one of the one or more second control devices.

15. The robot control method according to claim 11, wherein the allocating the communication resource is performed by the first communication unit of the first control device.

16. The robot control method according to claim 11, further comprising transmitting, by the second control device, a state value related to drive of the robot to the first control device.

17. The robot control method according to claim 11, further comprising determining, by an external device, a setting related to allocation of the communication resource in accordance with a user operation.

18. The robot control method according to claim 11, wherein the allocating the communication resource comprises adjusting a size of the communication resource by changing a length of a communication frame transmitted on the network.

19. The robot control method according to claim 11, wherein the allocating the communication resource comprises adjusting a size of the communication resource by changing a communication period of a communication frame transmitted on the network.

* * * * *